United States Patent
Seyama et al.

(10) Patent No.: US 9,497,735 B2
(45) Date of Patent: *Nov. 15, 2016

(54) METHOD OF SIGNAL MULTIPLEXING AND TRANSMITTER IN RADIO COMMUNICATION SYSTEM

(71) Applicant: FUJITSU LIMITED, Kawasaki-shi, Kanagawa (JP)

(72) Inventors: Takashi Seyama, Kawasaki (JP); Takashi Dateki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 399 days.

This patent is subject to a terminal disclaimer.

(21) Appl. No.: 14/012,540

(22) Filed: Aug. 28, 2013

(65) Prior Publication Data
US 2013/0343361 A1    Dec. 26, 2013

Related U.S. Application Data

(63) Continuation of application No. 12/195,698, filed on Aug. 21, 2008, now Pat. No. 8,615,000.

(30) Foreign Application Priority Data

Dec. 28, 2007  (JP) ................................ 2007-340001

(51) Int. Cl.
| | |
|---|---|
| *H04J 3/00* | (2006.01) |
| *H04W 72/04* | (2009.01) |
| *H04L 1/00* | (2006.01) |
| *H04L 5/00* | (2006.01) |

(Continued)

(52) U.S. Cl.
CPC ............ *H04W 72/04* (2013.01); *H04L 1/0026* (2013.01); *H04L 1/0079* (2013.01); *H04L 1/0086* (2013.01); *H04L 5/0016* (2013.01); *H04L 5/0044* (2013.01); *H04L 5/0055* (2013.01); *H04L 5/0057* (2013.01); *H04L 27/2636* (2013.01); *H04L 2001/125* (2013.01); *H04W 72/0466* (2013.01); *H04W 72/0473* (2013.01)

(58) Field of Classification Search
CPC ........... H04W 72/04; H04W 72/0466; H04W 72/0473
See application file for complete search history.

(56) References Cited

U.S. PATENT DOCUMENTS

| | | | |
|---|---|---|---|
| 6,289,485 | B1 | 9/2001 | Shiomoto |
| 7,620,417 | B2 | 11/2009 | Iochi et al. |

(Continued)

FOREIGN PATENT DOCUMENTS

| | | |
|---|---|---|
| EP | 1720310 A2 | 11/2006 |
| EP | 1806867 A2 | 7/2007 |

(Continued)

OTHER PUBLICATIONS

USPTO, (KAO) "U.S. Appl. No. 12/195,698 (parent)," [NOA] Notice of Allowance and Fees Due on Oct. 4, 2013.

(Continued)

*Primary Examiner* — Jutai Kao
(74) *Attorney, Agent, or Firm* — Fujitsu Patent Center

(57) ABSTRACT

A transmitter time-division-multiplexes, in time domain, to assign at least a part of a second signal stream of a second channel being relatively high error-resilient compared to a first signal stream of a first channel between a boundary of the blocks and the first signal stream of the first channel of a time-division-multiplexing signal.

5 Claims, 22 Drawing Sheets

US 9,497,735 B2

Page 2

(51) Int. Cl.
  H04L 1/12 (2006.01)
  H04L 27/26 (2006.01)

(56) References Cited

U.S. PATENT DOCUMENTS

| | | | |
|---|---|---|---|
| 8,488,692 | B2 | 7/2013 | Imamura et al. |
| 8,615,000 | B2* | 12/2013 | Seyama ............... H04L 1/0026 370/326 |
| 2005/0034049 | A1* | 2/2005 | Nemawarkar .......... H04L 67/12 714/758 |
| 2007/0004465 | A1* | 1/2007 | Papasakellariou .. H04W 52/325 455/571 |
| 2007/0263734 | A1* | 11/2007 | Seki ...................... H04L 1/0006 375/259 |
| 2008/0049668 | A1* | 2/2008 | Kakura .................... H04L 1/20 370/329 |
| 2008/0304467 | A1 | 12/2008 | Papasakellariou et al. |
| 2009/0005101 | A1* | 1/2009 | Matsumoto ........... H04L 1/0003 455/522 |
| 2009/0239484 | A1 | 9/2009 | Miyoshi et al. |
| 2010/0067453 | A1 | 3/2010 | Noh et al. |
| 2010/0103867 | A1 | 4/2010 | Kishiyama et al. |
| 2010/0290543 | A1 | 11/2010 | Iwai et al. |

FOREIGN PATENT DOCUMENTS

| | | |
|---|---|---|
| EP | 1901459 A1 | 3/2008 |
| EP | 1986342 A1 | 10/2008 |
| EP | 2001184 A2 | 12/2008 |
| JP | 8-116313 | 5/1996 |
| JP | 11-127138 | 5/1999 |
| JP | 2007-259377 A | 10/2007 |
| WO | 2005/120116 A1 | 12/2005 |
| WO | WO-2005/125049 A1 | 12/2005 |
| WO | WO-2006-095432 | 9/2006 |
| WO | WO-2006/095432 | 9/2006 |
| WO | WO-2006/095872 A1 | 9/2006 |
| WO | 2007/013559 A1 | 2/2007 |
| WO | 2007/032492 A1 | 3/2007 |
| WO | 2007/105765 A1 | 9/2007 |
| WO | WO-2007/136002 A1 | 11/2007 |

OTHER PUBLICATIONS

Japanese Office Action mailed Jul. 2, 2013 for corresponding Japanese Application No. 2012-130365 with English-language Translation.
EESR—Extended European Search Report of European Application No. 14188178.9 dated Jan. 26, 2015.
RAN4: "[Draft] LS on UE transmission power adjustments", 3GPP Draft; R4-072063_LS-TO-RAN1 on PC, 3rd Generation Partnership Project (3GPP), Mobile Competence Centre, vol. Ran WG4, No. Shanghai, China; Oct. 8, 2007-Oct. 12, 2007, Oct. 31, 2007 (Oct. 31, 2007), XP050611888, Sophia-Antipolis Cedex; France [retrieved on Oct. 31, 2007].
RAN4: "LS on the dynamic range of UE transmission power", 3GPP Draft; R1-073857 (R4-071422), 3rd Generation Partnership Project (3GPP), Mobile Competence Centre, vol. RAN WG1, Aug. 30, 2007 (Aug. 30, 2007), XP050488637, Sophia-Antipolis Cedex; France [retrieved on Aug. 30, 2007].
"JP Office Action", mailed Oct. 18, 2011 for corresponding Japanese Application No. 2007-340001 with English-language translation.
Panasonic, "Mapping position of control channel for Uplink SC-FDMA," TSG-RAN WG1 #43 R1-051395 Seoul, Korea, Nov. 7-Nov. 11, 2005, pp. 1-6.
Panasonic, "Mapping position of control channel for Uplink Shared Channel," 3GPP TSG RAN WG1 Meeting #51, R1-074916, Jeju, Korea, Nov. 5-9, 2007, pp. 1-2.
Samsung, "Control Signaling Location in Presence of Data in E-UTRA UL", 3GPP TSG RAN WG1 Meeting #49bis, R1-073094, Jan 29, 2007.
Mamoru Sawahashi, et al. "Optimum Multiplexing Method for ACK/NACK and CQI Information from Same User in Evolved UTRA Uplink", 2007 IEICE Communications Society Conference Papers 1, Aug. 29, 2007 pp. 354, B-5-32 (with Partial English-language translation).
Ericsson, "Uplink Non-data Associated control Signaling: Multiplexing", 3GPP TSG-RAN WG1 #48, R1-071033, Feb. 16, 2007.
Ericsson, "Uplink non-data-associated control signaling", 3GPP TSG-RAN WG1 #46bis, R1-062867 Oct. 13, 2006.
Ericsson, "Uplink non-data-associated control signaling—additional details", 3GPP TSG-RAN WG1 #46bis, R1-062868, Oct. 13, 2006.
Motorola, "Uplink Transmission of CQI and Ack/Nack", 3GPP TSG RAN1. #49-bis, R1-072706, Jun 29, 2007.
3 GPP TS 36.211 V8.0.0. 3rd Generation Partnership Project; Technical Specification Group Radio Access Network; Evolved Universal Terrestrial Radio Access (E-UTRA); Physical channels and modulation (Release 8); Sep. 2007.
"Control Signaling Location in Presence of Data in E-UTRA UL", 3 GPP TSG RAN WGl Meeting #50, R-073572, Samsung; Aug. 20-24, 2007.
3 GPP TS 36.101 V0.1.0, 3rd Generation Partnership Project; Technical Specification Group Radio Access Network; Evolved Universal Terrestrial Radio Access (E-UTRA); User Equipment (UE) radio transmission and reception; (Release 8); Nov. 2007.
USPTO, (Kao) Non-Final Rejection, Jun. 4, 2013, in parent U.S. Appl. No. 12/195,698 [pending].
USPTO, (Kao) Final Rejection, Sep. 26, 2012, in parent U.S. Appl. No. 12/195,698 [pending].
USPTO, (Kao) Non-Final Rejection, Dec. 22, 2011, in parent U.S. Appl. No. 12/195,698 [pending].
USPTO, (Kao) Final Rejection, Apr. 19, 2011, in parent U.S. Appl. No. 12/195,698 [pending].
USPTO, (Kao) Non-Final Rejection, Oct. 1, 2010, in parent U.S. Appl. No. 12/195,698 [pending].
Nokia Siemens Networks et al.: "ACK/NACK Transmission with UL data", 3GPP TSG RAN WG1, Draft, Meeting #49, R1-072313, 3rd Generation Partnership Project (3GPP), Mobile Competence Centre, vol. RAN WG1, May 2, 2007, XP050106043, Sophia-Antipolis Cedex, France.
Samsung: "Uplink ACK/NACK Signalling: FDM vs. TDM", 3GPP RAN1 LTE Ad Hoc, vol. R1-061699, Jun. 27, 2006, pp. 1-9, XP002492125, Cannes, France.
Extended European Search Report dated Apr. 22, 2014 for corresponding European Application No. 08163493.3 , 12 pages.

* cited by examiner

FIG. 16

| TRANSMISSION BAND (STARTING POSITION) | TRANSMISSION BANDWIDTH | | | | | | | |
|---|---|---|---|---|---|---|---|---|
| | 1 | 2 | 3 | 4 | 5 | 6 | 7 | 8 |
| 0 | 3 | 2 | 2 | 1 | 1 | 2 | 2 | 2 |
| 1 | 2 | 1 | 1 | 1 | 1 | 1 | 2 | |
| 2 | 1 | 1 | 1 | 1 | 1 | 2 | | |
| 3 | 1 | 1 | 1 | 1 | 1 | | | |
| 4 | 1 | 1 | 2 | | | | | |
| 5 | 2 | 2 | | | | | | |
| 6 | 3 | | | | | | | |
| 7 | | | | | | | | |

METHOD OF SIGNAL MULTIPLEXING AND TRANSMITTER IN RADIO COMMUNICATION SYSTEM

CROSS REFERENCE TO RELATED APPLICATION(S)

This application is a continuation of application Ser. No. 12/195,698, filed Aug. 21, 2008, which is based on and hereby claims priority to Japanese Application No. 2007-340001 filed on Dec. 28, 2007 in Japan, the contents of which are hereby incorporated by reference.

BACKGROUND (1) Field

The present invention relates to a method of signal multiplexing and a transmitter in a radio frequency transmission system. The present invention may be used in the system for time-division-multiplexing and transmitting a signal from a user equipment as one example of the transmitter to a radio frequency base station as one example of a receiver, for example.

(2) Description of Related Art

Transmission systems of the radio frequency communication includes the transmission system, which cyclically copies a part of a valid symbols and adds a CP (Cyclic Prefix) (also referred to as a guard interval (GI)) to the valid symbol in time domain for reducing intersymbol interference due to a delay wave.

An OFDM (Orthogonal Frequency Division Multiplexing) and a DFT-S OFDM (Discrete Fourier Transform-Spread OFDM) are representative ones of such transmission systems.

Among them, the DFT-S OFDM is single carrier transmission, so that this is excellent in PAPR (Peak to Average Power Ratio) characteristics and is capable of operating a power amplifier (PA) at an efficient operating point.

Therefore, the DFT-S OFDM is preferred as the transmission system of up-link (UL), which is in a direction from a user equipment (UE) to a base station (BS or eNodeB), and in a 3GPP (3rd Generation Partnership Project) E-UTRA (Evolved Universal Terrestrial Radio Access), application of an SC-FDMA (Single Carrier Frequency Division Multiple Access), which is an access system using the DFT-S OFDM to the UL communication is discussed (for example, refer to Non-Patent Document 1).

Also, in FIG. 2 of Non-Patent Document 2, a transmission format for multiplexing an ACK/NACK signal relative to a shared channel transmitted by down link (DL) and a CQI (Channel Quality Indicator) signal indicating a propagation channel quality of the DL measured at the receiver adjacent to the block into which a reference signal (RS) used for propagation channel training (channel estimation) is multiplexed is disclosed.

That is to say, in the transmission format, one slot is formed of seven blocks, the RS is multiplexed into the fourth block in the slot, and the ACK/NACK signal and the CQI signal are multiplexed at the ending of the third block and the beginning of the fifth block, which are adjacent to the RS, respectively.

Meanwhile, in the 3GPP LTE (Long Term Evolution), the rules about the EVM (Error Vector Magnitude) and SEM (Spectrum Emission Mask) representing the quality of the signal and about the adjacent channel leakage ratio (ACLR) are set (refer to Non-Patent Document 3).

[Non-Patent Document 1] 3GPP TS36.211 V8.0.0

[Non-Patent Document 2] 3GPP TSG-RAN WG1, R1-073572, "Control Signaling Location in Presence of Data in E-UTRA UL", Samsung

[Non-Patent Document 3] 3GPP TS36.101 V.0.1.0

In the transmission system for transmitting by adding the CP to the valid symbol, the signal is discontinuous at the boundary of each symbol (OFDM symbol and SC-FDMA symbol) after adding a CP, so that a frequency spectrum is infinitely spread and the electrical power leaks out of the signal band (this is also referred to as adjacent-band radiation).

In order to suppress this, in the transmission system, there is a case in which the pulse shaping is performed such that the signal is moderately attenuated in the vicinity of the symbol boundary by multiplying a window function (time window) such as a Raised Cosine function to the signal (symbol) and by filtering with a band-limiting filter or the like.

However, when such pulse shaping is performed, there is a case in which a signal attenuating portion due to the pulse shaping is included in the symbol, and the signal attenuating portion due to the pulse shaping of the adjacent symbol is mixed as the intersymbol interference at the time of detection of the valid symbol by eliminating the CP on the receiver side. Therefore, the signal quality (reception characteristics) such as the EVM or the like of the signal multiplexed in the vicinity of the symbol boundary is relatively easily deteriorated as compared to the signal multiplexed into other portions.

Also, in the radio communication system, there is a case in which the transmission power of the transmitter changes due to transmission power control or the like. In such a case, when this is a moderate power change as indicated by a solid line in FIG. 22 relative to an ideal power change as indicated by a dotted line in FIG. 22, for example, the quality of the signal (for example, EVM) multiplexed in the vicinity of the timing of the power change also is relatively easily deteriorated as compared with the signal multiplexed into other timings.

However, the above-described conventional technology does not perform the multiplexing of the transmission symbols in view of the characteristics that the signal quality in the vicinity of the symbol boundary and the power change point is easily deteriorated as compared to other portions. For example, the Non-Patent Document 2 only tries to improve the reception quality of the ACK/NACK signal and the CQI signal by multiplexing the ACK/NACK signal and the CQI signal at the temporally nearest (adjacent) position of the RS used for the propagation channel training.

SUMMARY

An object of the present invention is to specify a multiplexing method of a control signal as one example of signal stream of a first channel such as an ACK/NACK signal and a CQI signal, in view of characteristics that a signal quality in the vicinity of a symbol boundary and an electrical power changing point is easy to be deteriorated compared with other portions, thereby improving reception characteristics of the control signal.

Meanwhile, not being limited to the above-described object, the effect that is derived from each configuration described in the preferred embodiment for implementing the invention to be described later and may not be obtained by the conventional technique may also be considered as another object of the invention.

In order to achieve the above-described object, this specification discloses the following "method of signal multiplexing in radio frequency transmission system and transmitter".

(1) That is to say, a method of signal multiplexing herein disclosed is a method of signal multiplexing in a radio communication system, the system having a transmitter, which time-division-multiplexes signal streams of a plurality of channels at a predetermined block unit and transmits the multiplexed signal to a receiver, wherein the transmitter performs the time-division-multiplexing, in time domain, to assign at least a part of a second signal stream of a second channel being relatively high error-resilient compared to a signal of a first channel between a boundary of the blocks and the first signal stream of the first channel of the time-division-multiplexing signal.

(2) Herein, the signal stream of each of the channels may be time-division-multiplexed so as to be located in a direction away from the boundary of the blocks in descending order of the error-resilience of each signal.

(3) Further, another aspect of the method of signal multiplexing method disclosed herein is a method of signal multiplexing in a radio communication system, the system having a transmitter, which time-division-multiplexes signal streams of a plurality of channels and transmits the multiplexed signal to a receiver, wherein, the transmitter performs the time-division-multiplexing, in time domain, to assign at least a part of a second signal stream of a second channel being relatively high error-resilient compared to a first signal stream of a first channel between a timing at which transmitted power of the time-division-multiplexed signal changes and the first signal stream of the first channel.

(4) Also, the transmitter herein disclosed is provided with a time-division-multiplexer operable to time-division-multiplex signal streams of a plurality of channels to be transmitted to a receiver at a predetermined block unit; and a controller operable to control the time-division-multiplexer, in time domain, to assign at least a part of a second signal stream of a second channel being relatively high error-resilient compared to a first signal stream of a first channel between a boundary of the blocks and the first signal stream of the first channel of the time-division-multiplexed signal.

(5) Herein, the second signal stream of the second channel being relatively high error-resilient may be the signal stream of which code length is longer than the code length of the first signal stream of the first channel.

(6) Also, the first signal stream of the first channel may be the signal stream of a control channel, and the second signal stream may be the signal stream of a data channel.

(7) Further, the controller may determine an amount of the second signal stream of the second channel assigned between the boundary of the blocks and the block assigned with the element signal of the first signal stream of the first channel according to any one or combination of two or more of a system band which is a frequency band available in the radio communication system, an allocated frequency bandwidth allocated by the receiver, and an allocated frequency band allocated by the receiver.

(8) Also, the controller may determine an amount of the second signal stream of the second channel assigned between the boundary of the blocks and the block assigned with the element signal of the first signal stream of the first channel according to whether or not the boundary of the blocks is the boundary with the block at which a reference signal used for propagation channel estimation in the receiver is multiplexed.

(9) Further, the controller may control the time-division-multiplexing such that the signal stream of each of the channels is located in a direction away from the boundary of the blocks in a descending order of the error-resilience of each signal.

(10) Further, another aspect of the transmitter herein disclosed is provided with a time-division-multiplexer operable to time-division-multiplex signal streams of a plurality of channels to be transmitted to a receiver; and a controller operable to control the time-division-multiplexer, in time domain, to assign at least a part of a second signal stream of a second channel being relatively high error-resilient compared to a first signal stream of a first channel between a timing at which transmitted power of the time-division-multiplexed signal changes and the first signal stream of the first channel.

According to the above-disclosed technology, it becomes possible to improve the reception quality of the first signal stream of the first channel (for example, the signal stream of the control channel) at the receiver.

The above and other objects and features of the present invention will be understood by reading carefully the following description with accompanying drawings. Preferred embodiments of the present invention will be described in more detail referring to the accompanying drawings. The drawings are illustrative and are not to be limitative of the scope of the present invention.

BRIEF DESCRIPTION OF THE DRAWINGS

FIG. 16 is a view illustrating one example of data for determining (selecting) the number of offset symbols used in the channel multiplexing process in the transmitter shown in FIG. 14;

DESCRIPTION OF EMBODIMENT(S)

Hereinafter, an embodiment of the present invention will be described with reference to the drawings. However, the embodiment to be described below is illustrative only, and this is not intended to preclude application of various modifications and techniques, which are not clearly shown in the embodiment to be described below. That is to say, the modification such as combination of the embodiments is possible.

[1] Briefing

As described above, a radio communication system using a CP (GI) has characteristics that a signal quality is relatively easily degraded near a boundary of a symbol, being a signal unit obtained by adding the CP and a change point (timing) of transmitted power as compared to other portions, in time domain.

Therefore, in the embodiment to be described below, it is assumed that a transmitter time-division-multiplexes a control signal such as an ACK/NACK signal and a CQI signal at a symbol time spaced apart (offset) from such symbol boundary and change point of transmitted power by one symbol time or more and transmits the same to a receiver.

At that time, if it is configured to time-division-multiplex a part of or all of data signals having a longer code length and higher error resilience (error correction capability) than those of the control signal in general at the symbol time assigned between the symbol boundary and the change point of the transmitted power, and the control signal, it also becomes possible to limit an impact of the characteristics to (error correction) decoding characteristics at the receiver.

In other words, it is preferable that at least a part of the data signals is time-division-multiplexed in preference to the control signal at a time interval in which a signal power changes due to transmission process at the transmitter.

Meanwhile, the control signal is a signal stream of a control channel and is one example of the signal (symbol) stream of a first channel, and the data signal is the signal (symbol) stream of a data channel and is one example of the signal stream of a second channel.

Also, hereinafter, an SC-FDMA system is cited as an example of a radio transmission system using the CP. Also, in order to distinguish the signal unit obtained by adding the CP to a valid symbol as described above (SC-FDMA symbol) from the signal unit forming the SC-FDMA symbol, for convenience the SC-FDMA symbol is referred to as a block and a component signal forming the same is referred to as a symbol.

Figure 1:
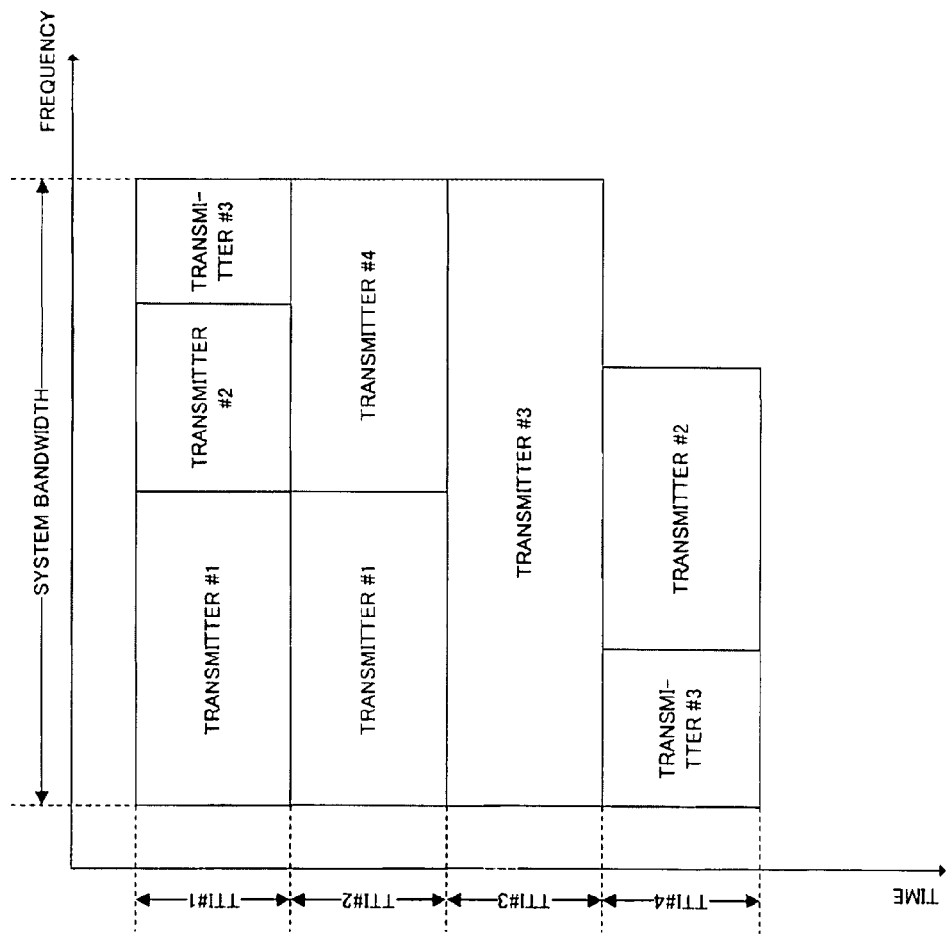
FIG. 1 is a view illustrating an allocation example of radio resources in a system band.

In the SC-FDMA system, as shown in FIG. 1, for example, it is possible that a plurality of transmitters (UEs, for example) share frequency resources (system frequency resources) in a system band in the same time interval (TTI: Transmission Time Interval) to perform communication with the receiver (for example, BS or eNodeB). Meanwhile, the system band is intended to mean an amount of radio resources (frequency resources), which may be allocated to the transmitters by the BS or eNodeB as one example of the receivers.

For example, in FIG. 1., three UEs #1, #2 and #3 may share the system frequency resource to perform the communication with the BS in the time interval of TTI#1, and two UEs #1 and #4 may share the system frequency resources to perform the communication with the BS in the time interval of TTI#2. Also, one UE #3 may occupy all of the system frequency resource to perform the communication with the BS in the time interval of TTI#3, and two UEs #3 and #2 may share the system frequency resources to perform the communication with the BS in the time interval of TTI#4.

[2] First Embodiment

Figure 2:
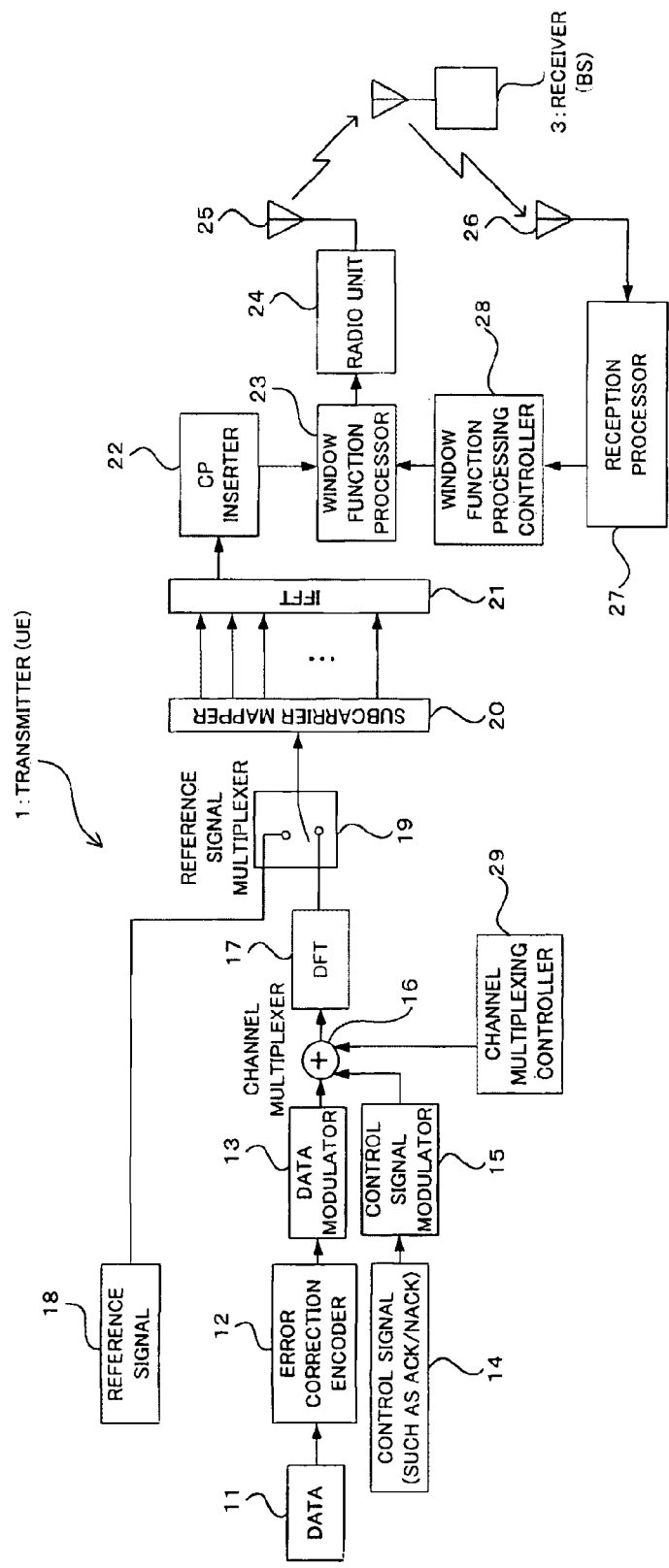
FIG. 2 is a block diagram illustrating a configuration example of a transmitter (UE) according to a first embodiment.
Figure 7:
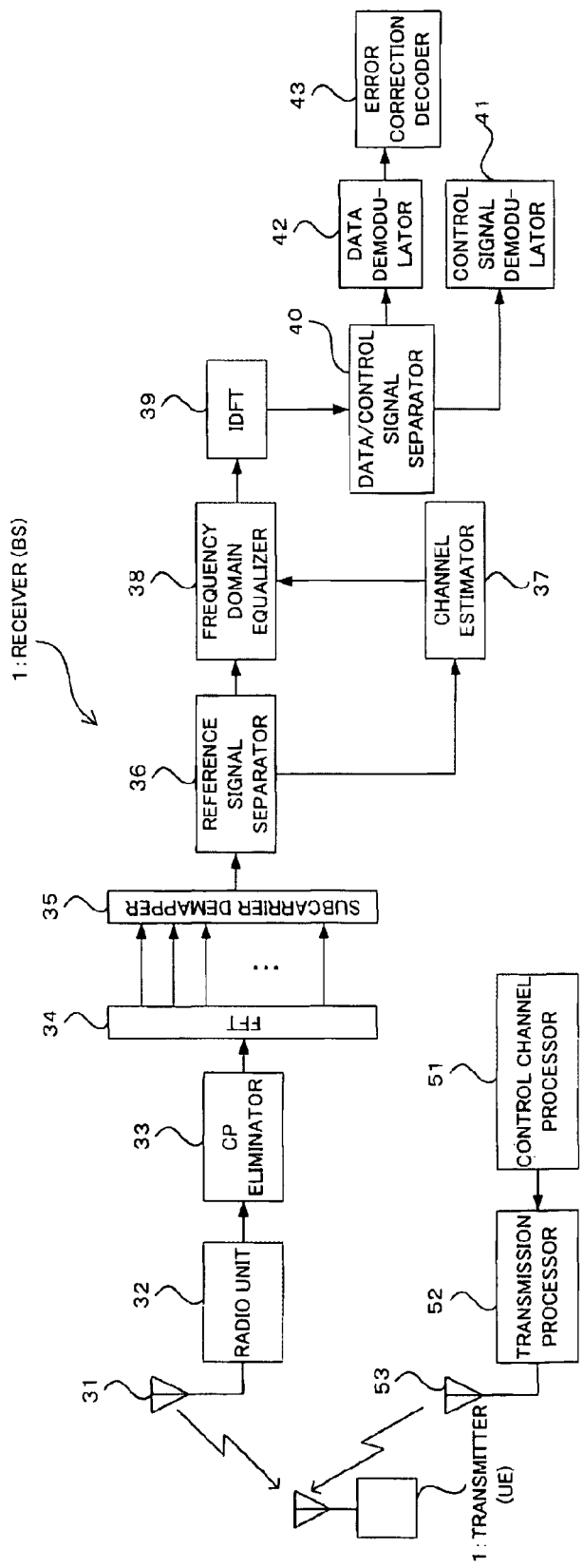
FIG. 7 is a block diagram illustrating a configuration example of a receiver (BS) according to the first embodiment.

FIG. 2 is a block diagram illustrating a configuration of the transmitter according to a first embodiment, and FIG. 7 is a block diagram illustrating a configuration of a receiver 3, which communicates with a transmitter 1 shown in FIG. 2 through a radio link. Sometimes the transmitter 1 is a user equipment (UE) and the receiver 3 is a base station (BS), and other times, the transmitter 1 is the BS and the receiver 3 is the UE, on the other hand. However, in the following, it will be described on the assumption that the transmitter 1 is the UE and the receiver 3 is the BS.

(Transmitter 1)

As shown in FIG. 2, the transmitter (UE) 1 of this embodiment is provided with, for example, a data generator 11, an error correction encoder 12, a data modulator 13, a control signal generator 14, a control signal modulator 15, a channel multiplexer 16, a DFT (Discrete Fourier Transformer) 17, a reference signal generator 18, a reference signal multiplexer 19, a subcarrier mapper 20, an IFFT (Inverse Fast Fourier Transformer) 21, a CP inserter 22, a window function processor 23, a radio unit 24, a transmitting antenna 25, a receiving antenna 26, a reception processor 27, a window function processing controller 28, and a channel multiplex controller 29.

The data generator 11 generates the data signal to be transmitted to the receiver 3. The data signal includes various data other than control information, such as audio, letter, image, and moving image.

The error correction encoder 12 error-correction-encodes the data signal generated by the data generator 11. An error correction code includes a turbo code.

The data modulator 13 modulates a bit stream obtained by the error correction encoder 12 with a predetermined modulation scheme, and when applying a multilevel modulation scheme such as a QPSK and a 16-QAM, this modulates the same to a data signal symbol (hereinafter, also referred to as a data symbol) having an in-phase component (I component) and an orthogonal component (Q component).

The control signal generator 14 generates the control signal including the ACK/NACK signal and the CQI signal. The ACK signal is generated when a reception process of the signal received from the receiver 3 is normally performed (for example, without CRC error) and the NACK signal is generated when the reception process is not normally performed, on the other hand. Also, the CQI signal is cyclically determined and generated based on a reception quality of the signal received from the receiver 3.

The control signal modulator 15 modulates the control signal generated by the control signal generator 14 with the predetermined modulation scheme (this may be same as or different from the modulation scheme for the data signal), and when the multilevel modulation scheme such as the QPSK and the 16-QAM is applied, this modulates the same to the control signal symbol having the in-phase component (I component) and the orthogonal component (Q component). Meanwhile, the control signal may be error-correction-encoded by turbo encoding or the like as the data signal.

The channel multiplexer 16 time-division-multiplexes the data signal symbol obtained by the data modulator 13 and the control signal symbol obtained by the control signal modulator 15 to generate $N_{DFT}$ symbol streams C(k) ($0 \leq k \leq N_{DFT}-1$).

Figure 3:
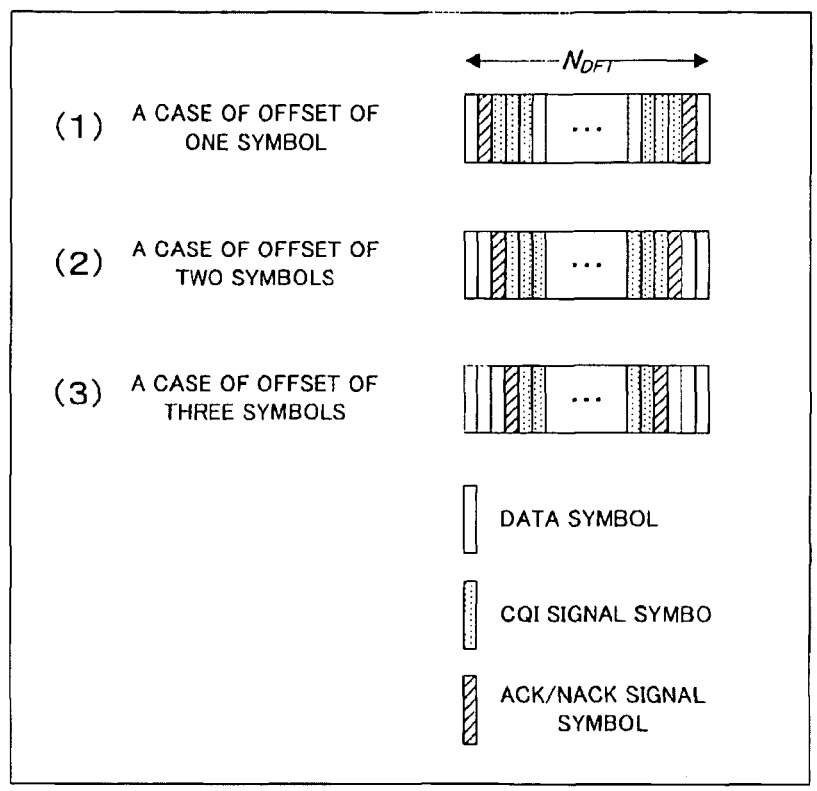
FIG. 3 is a schematic diagram illustrating one example of channel multiplexing process in a channel multiplexer of the transmitter shown in FIG. 2.

However, the channel multiplexer 16 of this embodiment performs multiplexing (hereinafter, also referred to as offset multiplexing) such that the control signal symbol is arranged at a position (timing) spaced apart (offset) from a boundary of the blocks by a time period of the predetermined number of symbols, in time domain, as shown in FIG. 3, for example. The offset multiplexing is controlled (set) by the channel multiplexing controller 29, for example.

Each of (1) to (3) in FIG. 3 shows a state in which the control signal symbol is time-division-multiplexed at the position (timing) offset from the boundary of the blocks by one to three symbol time. In other words, the channel multiplexer 16 performs the time-division-multiplexing to assign one or more symbol of the signal other than the control signal between the control signal and the boundary of the blocks.

At that time, the signal is easily degraded near the boundary of the blocks, so that it is preferable that the signal (offset symbol) to be assigned between the control signal and the boundary of the blocks is the signal of which importance is lower than that of the control signal, the signal of which error resilience is higher than that of the control signal, for example, a part of or all of signals (data signals, in this embodiment), which affects little the reception characteristics after decoding due to the code length longer than that of the control signal and the error correction capability relatively higher than that of the control signal.

Therefore, even in the same control signals, when there is a difference in a degree of importance and in the code length, it may be set that the time-division-multiplexing is performed at the position (timing) closer to the boundary of the blocks in a case of the signal having the lower importance and the signal having the longer code length.

For example, when comparing the ACK/NACK signal to the CQI signal, generally, the importance and the code length of the CQI signal are lower and longer than those of the ACK/NACK signal, respectively (the ACK/NACK signal is about 1 or 2 bit and the CQI signal is about 20 bits), so that it is preferable that the CQI signal is time-division-multiplexed at the timing closer to the boundary of the blocks.

Figure 4:
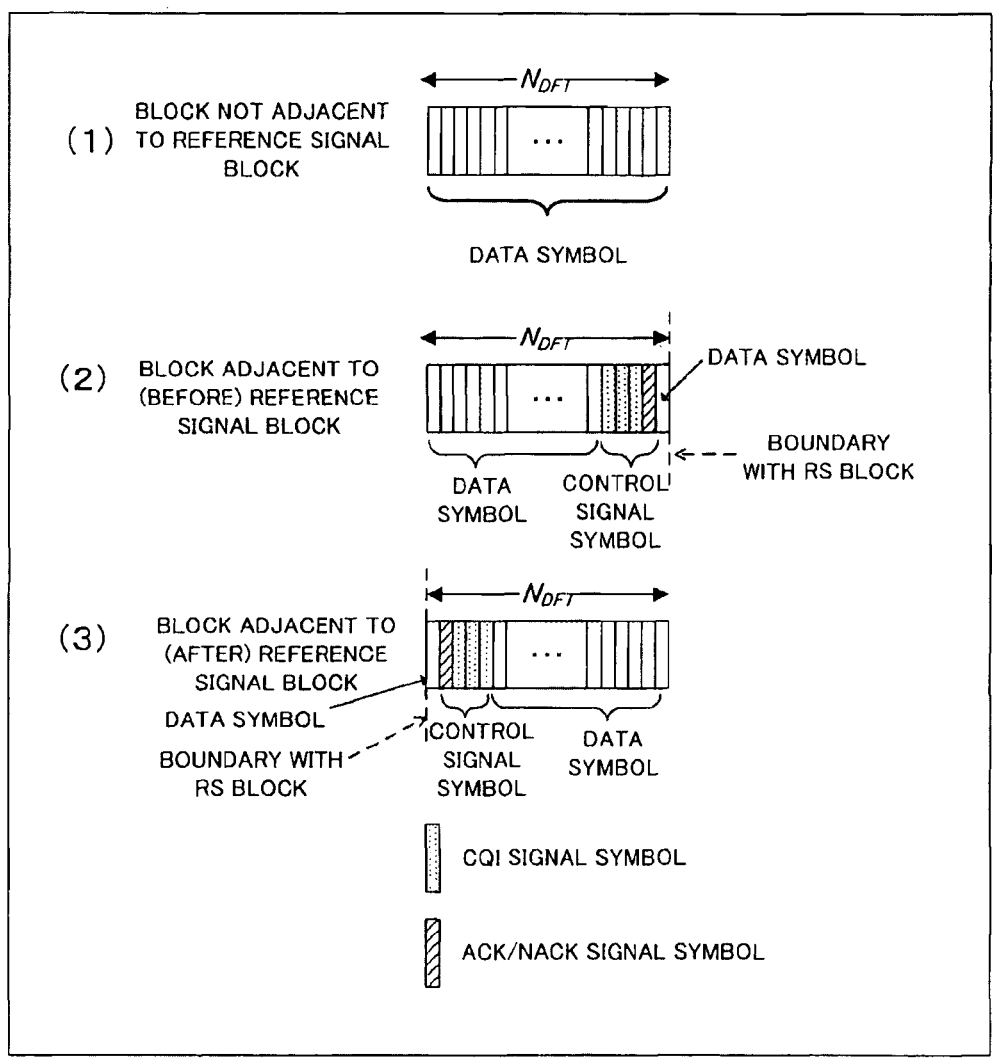
FIG. 4 is a schematic diagram illustrating one example of the channel multiplexing process in the transmitter shown in FIG. 2.

However, as shown in FIG. 3 and FIG. 4 to be described later, this does not preclude the time-division-multiplex of the ACK/NACK signal at the timing closer to the boundary of the blocks.

Meanwhile, it is desirable to determine the number of offset symbols in view of a length of a signal attenuation interval (Nwin), time duration per one symbol, a variety of parameters such as ACLR, SEM, and EVM required by system. One example thereof will be described later.

Also, the offset multiplexing is not required to be implemented in blocks and this may be limited to a part of blocks. For example, when a reference signal (RS) is cyclically transmitted as in the Non-Patent Document 2, a target block of the offset multiplexing may be limited to the block adjacent to the block at which the RS is multiplexed.

FIG. 4 shows one example thereof. (2) of FIG. 4 shows a state in which the control signal symbol is multiplexed at the block adjacent to and temporally before the RS block to assign the data symbol of one symbol time between the same and the boundary of the blocks, (3) of FIG. 4 shows a state in which in the block adjacent to the RS block temporally after the same, the control signal symbol is multiplexed to assign the data symbol of one symbol time between the same and the boundary of the blocks, and (1) of FIG. 4 shows a state in which the control signal symbol is not multiplexed in the block, which is not adjacent to the RS block, respectively.

Meanwhile, the number of offset symbols may be two or more, and this may be determined in view of a degree of degraded of channel estimation accuracy used for compensating (equalizing) the control signal, due to a temporal distance of the control signal from the RS according to the offset multiplexing, as one of the parameters.

That is to say, the channel multiplex controller 29 is capable of determining the amount of the data signal assigned between the boundary of the blocks and the control signal according to whether the boundary of the blocks is the boundary with the block at which the reference signal used for estimating propagation channel estimation in the receiver is multiplexed.

Also, the number of offset symbols may be the same for each target block of the offset multiplexing or may be different for each of one or a plurality of target block. Further, the number of offset symbols may be notified from the transmitter 1 to the receiver 3 as one of the control signals in order to allow the receiver 3 to recognize, or this may be set in advance in the transmitter 1 (channel multiplex controller 29) and the receiver 3 (CP eliminator 33) as a system specification. In the latter case, it is possible to eliminate the need for the notification from the transmitter 1 to the receiver 3.

Next, the DFT 17 converts the multiplexed signal obtained by the channel multiplexer 16 to $N_{DFT}$ frequency domain signals C (n) by performing $N_{DFT}$ point DFT (Discrete-Fourier Transform) processing in units of $N_{DFT}$ symbol streams C (k), as represented by a following equation (1).

$$C(n) = \sqrt{\frac{1}{N_{DFT}}} \sum_{k=0}^{N_{DFT}-1} c(k)\exp\left(-j\frac{2\pi nk}{N_{DFT}}\right) \quad (1)$$

The reference signal (RS) generator 18 generates the RS used by the receiver 3 for propagation channel training (channel estimation) and propagation channel compensation between the same and the transmitter 1.

The reference signal multiplexer 19 performs interblock multiplexing between the block at which the data symbol and the control signal symbol are time-division-multiplexed, and the RS, by selectively outputting an output of the DFT 17 and the RS generated by the RS generator 18.

The subcarrier mapper 20 maps the interblock multiplexed signal to an allocated subcarrier component. A mapping method includes a local mapping for mapping to $N_{DFT}$ sequential subcarriers for maintaining single carrier characteristics and distributed mapping for cyclically inserting a 0 signal between transmitted signals. The 0 signal is mapped to the subcarrier component, which is not allocated. Thereby, $N_{DFT}$ frequency domain signals C (n) become $N_{FFT}$ frequency domain signals C' (n).

The IFFT 21 converts the $N_{FFT}$ frequency domain signals C' (n) to $N_{FFT}$ sample time domain signal s (k) by performing $N_{FFT}$ point IFFT (Inverse Fast Fourier Transform) processing as represented in a following equation (2).

$$s(k) = \sqrt{\frac{1}{N_{FFT}}} \sum_{n=0}^{N_{FFT}-1} C'(n) \exp\left(j\frac{2\pi nk}{N_{FFT}}\right) \quad (2)$$

Figure 5:
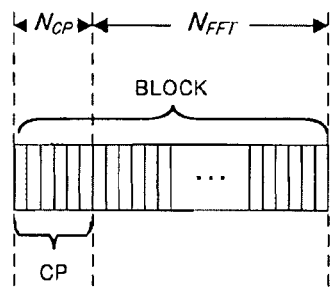
FIG. 5 is a schematic view illustrating one example of CP insertion process at the transmitter shown in FIG. 2.

The CP inserter 22 adds a trailing $N_{CP}$ sample of the time domain signal (valid symbol) s (k) to the beginning of the time domain signal s(k), as represented in a following equation (3) to generate a $N_{FFT}+N_{CP}$ sample signal block $s_{block}$ (t) (refer to FIG. 5). Note that $0 \leq t \leq N_{CP}+N_{FFT}-1$.

$$s_{block}(t)=s(t-N_{CP}) \quad (3)$$

Figure 6:
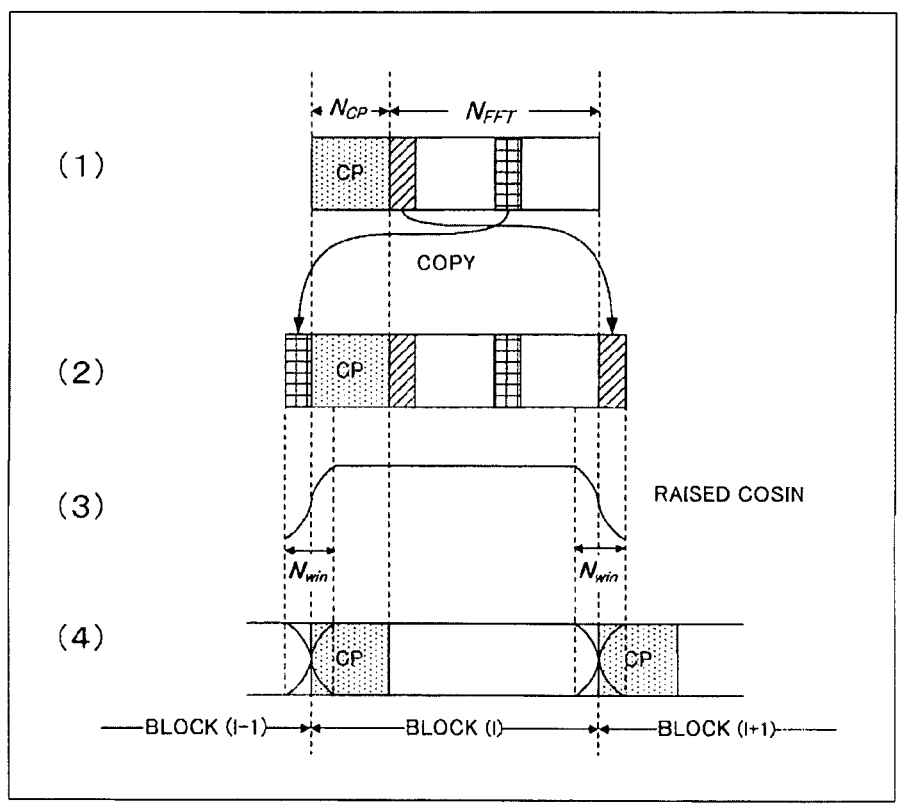
FIG. 6 is a schematic view illustrating one example of window function processing at the transmitter shown in FIG. 2.

The window function processor 23 copies $N_{win}/2$ sample signal to the beginning and ending of the block such that the signal is continuous in the block, as represented in following equations (4) to (6) and shown in (1) and (2) of FIG. 6. Herein, $N_{win}$ is determined by the window function processing controller 28 according to a system band, an allocated transmission bandwidth, and an allocated transmission band. The longer the $N_{win}$ being an interval in which the window function is multiplied (interval in which a signal attenuation process is performed) is, the larger EVM degradation is.

$$s'(t)=s_{block}(t+N_{FFT}-N_{win}/2), -N_{win}/2 \leq t \leq -1 \quad (4)$$

$$s'(t)=s_{block}(t), 0 \leq t \leq N_{CP}+N_{FFT}-1 \quad (5)$$

$$s'(t)=s_{block}(t+N_{CP}), N_{CP}+N_{FFT} \leq t \leq N_{CP}+N_{FFT}+N_{win}/2-1 \quad (6)$$

Meanwhile, the allocated transmission bandwidth is intended to mean a resource amount allocated as frequency resources by the receiver 3 to the transmitter 1 as the frequency resources to be used by the transmitter 1 for transmitting, and allocation is possible in unit referred to as a resource block (RB). Herein, 1 RB has 1 subcarrier bandwidth, and this may be a basic unit when the receiver 3 selects (schedules) the frequency resource (transmission band) to be allocated to the transmitter 1 allowed to transmit.

Also, the allocated transmission band indicates an occupied position in the system band of the frequency resources allocated by the receiver 3 to the transmitter 1, and for example, an arranging (starting) position of the allocated transmission bandwidth is indicated as an offset value or the like of the RB unit.

Next, the window function processor 23 multiplies a window function w(t) such that the signal is moderately attenuated at both ends of the block (time interval of $N_{win}$) as represented in a following equation (7) and shown in FIGS. 6 (2) and 6 (3).

$$s''(t)=s'(t) \cdot w(t) \quad (7)$$

When a raised cosine waveform is used as an example of the window function w(t) this is represented by a following equation (8).

$$w(t) = \begin{cases} \frac{1}{2} + \frac{1}{2}\sin\left(\frac{\pi}{N_{win}}t\right) & -\frac{N_{win}}{2} \leq t \leq \frac{N_{win}}{2} - 1 \\ 1 & \frac{N_{win}}{2} \leq t \leq N_{GI} + N_{FFT} - \frac{N_{win}}{2} - 1 \\ \frac{1}{2} - \frac{1}{2}\sin\left(\frac{\pi}{N_{win}}\left(\frac{t-N_{GI}-}{N_{FFT}}\right)\right) & N_{GI} + N_{FFT} - \frac{N_{win}}{2} \leq t \leq N_{GI} + N_{FFT} + \frac{N_{win}}{2} - 1 \end{cases} \quad (8)$$

Next, the window function processor 23 adds the signal attenuation unit between adjacent blocks such that an average power is constant as represented in following equations (9) and (10) and shown in (4) of FIG. 6.

$$s_{TW}(t) = s''(l-1, t+N_{GI}+N_{FFT}-1) + s''(l, t), \quad (9)$$
$$-\frac{N_{win}}{2} \leq t \leq \frac{N_{win}}{2} - 1$$

$$s_{TW}(t) = s''(l, t) + s''(l, t-N_{GI}-N_{FFT}+1), \quad (10)$$
$$N_{GI} + N_{FFT} - \frac{N_{win}}{2} - 1 \leq t \leq N_{GI} + N_{FFT} + \frac{N_{win}}{2} - 1$$

Meanwhile, the above-described window function processing is one of means for suppressing power leakage out of the signal band, and other than this, means for performing equivalent signal attenuation process using a band limitation filter is also applicable.

The radio unit 24 performs digital to analogue (DA) conversion and frequency conversion (up conversion) to the radio frequency to an output of the window function processor 23, and transmits the same from the transmitting antenna 25 to the receiver 3.

The reception processor 27 performs reception process to the signal from the receiver 3 received by the receiving antenna 26. The reception process includes low noise amplification, frequency conversion (down conversion) to a base band frequency, analogue to digital (AD) conversion, demodulation, decoding, or the like. In addition, the received signal includes signals of common control channel and individual control channel, the signal of the common control channel includes information regarding the system band, and the signal of the individual control channel includes information regarding the allocated transmission band and the allocated transmission bandwidth.

The window function processing controller 28 controls the window function processing (setting of $N_{win}$) at the window function processor 23 according to the information such as the system band, the allocated transmission bandwidth, and the allocated transmission band, obtained at the reception processor 27.

(Receiver 3)

On the other hand, as shown in FIG. 7, the receiver 3 is provided with, for example, a receiving antenna 31, a radio unit 32, a CP eliminator 33, a FFT (Fast Fourier Transformer) 34, a subcarrier demapper 35, a reference signal separator 36, a channel estimator 37, a frequency domain equalizer 38, an IDFT (Inverse Discrete Fourier Transformer) 39, a data/control signal separator 40, a control signal demodulator 41, a data demodulator 42, an error correction decoder 43, a control channel processor 51, a transmission processor 52, and a transmitting antenna 53.

The radio unit 32 performs the low noise amplification, the frequency conversion (down conversion) from the radio frequency to the base band frequency, and the AD conversion to the signal received by the receiving antenna 31.

Figure 8:
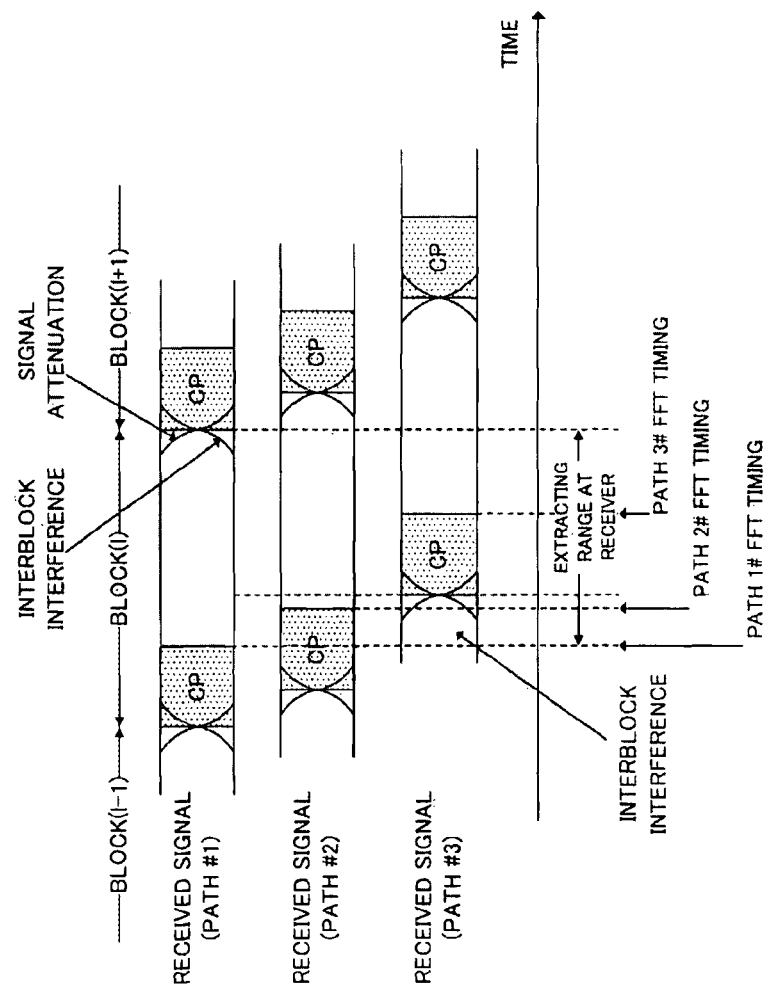
FIG. 8 is a schematic diagram illustrating one example of valid symbol detection process at the receiver shown in FIG. 7.

The CP eliminator 33 eliminates the CP from the received signal processed at the radio frequency processor 32 and extracts (slips) the valid symbol portion of the block. This is illustrated in FIG. 8. That is to say, the CP eliminator 32 clips the valid symbol portion at the FFT timing of a leading path (herein, a path #1) of which received power is the largest. As for a path #2, although the signal is clipped in a form including apart of the CP, since the CP is obtained by cyclically copying the valid symbol, as a result, it is possible to correctly clip only the valid symbol ($N_{FFT}$ sample).

However, as for a path #3 of a delay wave of which delay time is longer than a CP length, the signal of an adjacent (l−1th) block is mixed into the valid symbol as an interblock inference. Also, as for the path #1, there is a case in which a portion in which the signal is attenuated by the window function processing at the transmitter 1 is included in the valid symbol. Also, the portion in which the window function processing is performed of a (l+1th) block of the path #2 might be mixed into the valid symbol of an adjacent (l+1)th block.

Figure 9:
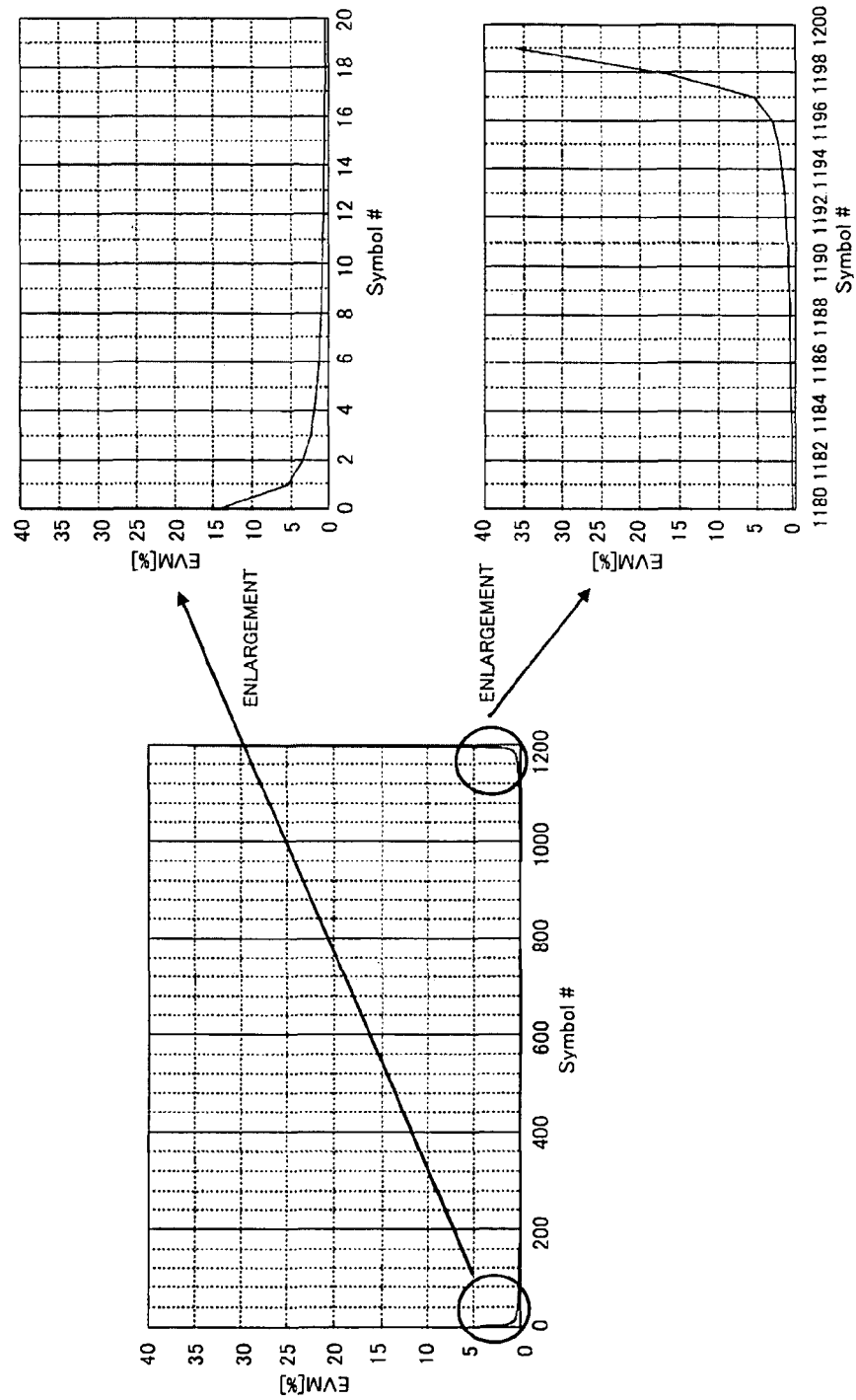
FIG. 9 is a view illustrating one example of a simulation result of EVM.

These events might produce the EVM degradation of the symbol arranged at the beginning and/or ending of the block in a DFT-S OFDM. FIG. 9 shows one example of a simulation result of the EVM for each symbol in a case in which $N_{DFT}$=1200, $N_{FFT}$=2048, and $N_{win}$=12. As shown in FIG. 9, it is understood that the degradation of the symbol near the boundary of the blocks (beginning and ending) is significant.

Therefore, when the control signal such as the ACK/NACK signal and the CQI signal of which code length is longer than that of the data signal is time-division-multiplexed at the symbol adjacent to the boundary of the blocks, this is susceptible to the effect of the EVM degradation and the reception characteristics thereof is easily degraded, than other symbols.

However, in this embodiment, in the transmitter 1, since the control signal is time-division-multiplexed so as to be spaced apart from the boundary of the blocks by one symbol or more through at least a part of the data symbol, this is less subject to the EVM degradation, and it is possible to suppress the degradation in the reception characteristics. In this case, although the signal other than the control signal multiplexed adjacent to the boundary of the blocks is susceptible to the effect of the EVM degradation, in a case in which this is at least a part of the signals of which code length is longer than that of the control signal, probability thereof to be correctly decoded by the error correction decoding is higher than that of the control signal.

Also, it is not necessary to intentionally shift in a time direction (bring forward) the clipping range in the CP eliminator 33, so that the substantive CP length becomes shorter, and it is possible to avoid increase in the interblock interference by a multipath longer than the CP length time.

Next, the FFT 34 converts the received signal (valid symbol) obtained by eliminating the CP in the CP eliminator 33 as described above to the frequency domain signal by $N_{FFT}$ point FFT processing, and inputs the same to the subcarrier demapper 35.

The subcarrier demapper 35 takes out the subcarrier component of the allocated transmission band from the frequency domain signal obtained by the FFT processing and inputs the same to the reference signal separator 36.

The reference signal separator 36 separates the RS and the signal of other channel from the received signal of the subcarrier component input from the subcarrier demapper 35, and inputs the RS to the channel estimator and the signal of other channel to the frequency domain equalizer 38, respectively.

The channel estimator 37 estimates a received channel state between the same and the transmitter 1 using the RS.

The frequency domain equalizer 38 equalizes (compensates) the received signal of the channel other than the separated RS in the frequency domain by using a estimated result (channel estimation value) by the channel estimator 37 and outputs the same to the IDFT 39.

The IDFT 39 converts the equalized received signal to $N_{DFT}$ time domain signals (received symbol streams) by the $N_{DFT}$ point Inverse Discrete Fourier Transform (IDFT) processing and inputs the same to the data/control signal separator 40.

The data/control signal separator 40 separates the time-division-multiplexed received data symbol and the received control signal symbol from the $N_{DFT}$ time domain received symbol streams, and inputs the received data symbol to the data demodulator 42 and the received control signal symbol to the control signal demodulator 41, respectively.

The control signal demodulator 41 demodulates the received control signal symbol, which is input, with a demodulation scheme corresponding to the modulation scheme in the transmitter 1, and the data demodulation unit 42 demodulates the received data symbol, which is input, with the demodulation scheme corresponding to the modulation system in the transmitter 1.

The error correction decoder 43 error-correction-decodes the received data symbol, which is demodulated, with the decoding scheme corresponding to the error correction encoding scheme in the transmitter 1.

Meanwhile, when the control signal symbol is error-correction-encoded at the transmitter 1, the control signal symbol also is error-correction-decoded with the decoding scheme corresponding to the error correction encoding scheme.

The control channel processor 51 generates the signal of the common control channel including the information regarding the system band and the signal of the individual control channel including the information regarding the transmission allocated bandwidth and the transmission allocated band, and transmits the same to the transmission processor 52.

The transmission processor 52 performs the DA conversion, the frequency conversion (up conversion) to the radio frequency, and the amplification to a predetermined transmitted power to the signal of each control channel, and transmits the same from the transmitting antenna 53 to the transmitter 1.

As described above, according to this embodiment, since the control signal is multiplexed so as to be temporally offset from the boundary of the blocks to assign at least a part of the data signal as one example of the signal other than the control signal between the control signal and the boundary of the blocks in the time domain, when time-division-multiplexing the data signal and the control signal in the transmitter 1, it is possible to temporally keep the control signal away from the boundary of the blocks (signal attenuation interval) to which pulse shaping process (signal attenuation process) is performed using the window function and the band limiting filter or the like in the transmission process at the transmitter 1.

Therefore, it becomes possible to time-division-multiplex the control signals while avoiding the symbol of which signal quality is degraded near the boundary of the blocks, it becomes possible to suppress the degradation of the signal quality such as the EVM regarding the control signal due to the signal attenuation process, and further it becomes possible to improve the reception quality of the control signal at the receiver 3.

Then, as a preferred aspect, since data signal (symbol) assigned between the control signal and the boundary of the blocks is the component signal of the data signal of which code length is longer than that of the control signal, even when the signal quality near the boundary of the blocks is easily degraded, the impact on the decoding characteristics at the receiver 3 is small.

[3] Second Embodiment

Figure 10:
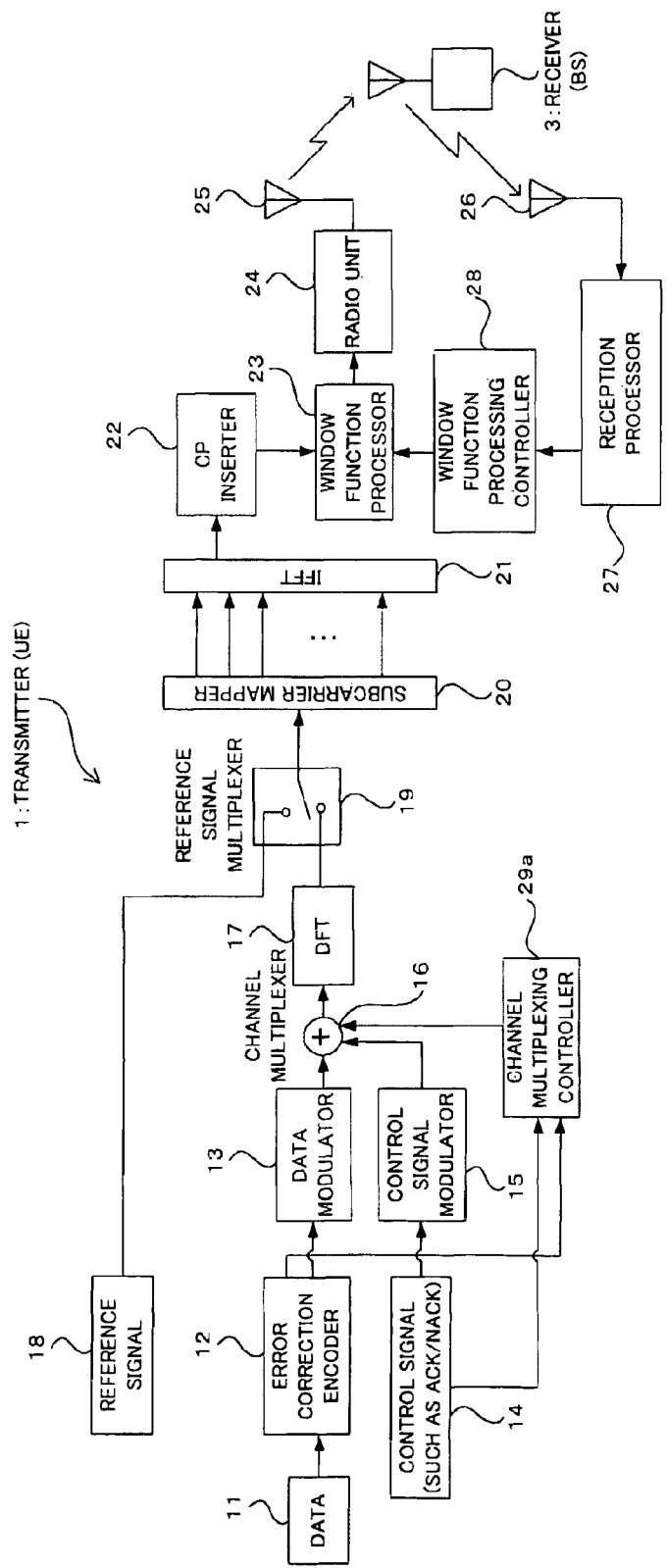
FIG. 10 is a block diagram illustrating a configuration example of the transmitter (UE) according to a second embodiment.

FIG. 10 is a block diagram illustrating a configuration of the transmitter (UE) according to a second embodiment. The transmitter 1 shown in FIG. 10 is different from the already described transmitter 1 shown in FIG. 2 in that this is alternatively provided with a channel multiplex controller 29a. Meanwhile, in FIG. 10, the component given the same reference numeral as already described numeral is provided with the function the same as or similar to that already described unless otherwise noted hereinafter. In addition, the configuration of the receiver 3 may be the same as or similar to that of already described receiver.

Herein, the channel multiplex controller 29a of this embodiment controls the time-division-multiplexing process by the channel multiplexer 16 based on the code lengths of the data signal and the control signal (such as CQI signal and ACK/NACK signal) each modulated at modulators 13 and 15, respectively. In greater detail, the time-division-multiplexing process is controlled such that the signal of which code length is longer is multiplexed at the timing closer to the boundary of the blocks than other signals.

This is because the signal of which code length is longer has less impact to the reception characteristics after decoding at the receiver 3, since the probability thereof that the error correction decoding is possible based on the remaining symbol may be higher than that of the signal of which code length is shorter, even though this includes the symbol of which signal quality is easily degraded by the signal attenuation process adjacent to the boundary of the blocks, as described above.

Figure 11:
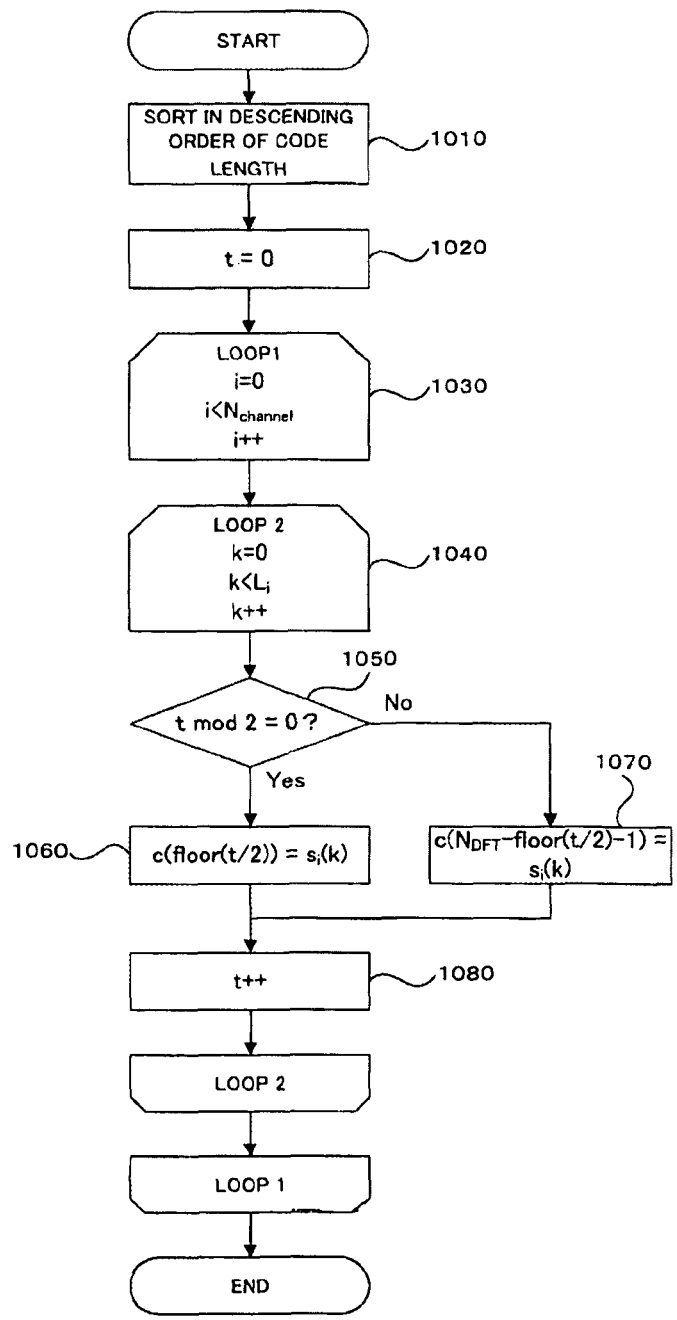
FIG. 11 is a flowchart illustrating one example of channel multiplexing process (algorithm)

FIG. 11 illustrates one example of the channel multiplexing algorithm by the channel multiplex controller 29a. First, the channel multiplex controller 29a sorts the signals of $N_{channel}$ channels (data channel and control channel) in descending order of the code length (process 1010).

Then the channel multiplex controller 29a controls the channel multiplexer 16 such that the symbols are alternately multiplexed from both ends to the center portion of the block as from i=0 (that is to say, from the symbol stream of the channel of which code length is long), 0th (leading) symbol of the block of $N_{DFT}$ symbol length, $N_{DFT}$–1th (trailing) symbol, first (next to the leading symbol) symbol, $N_{DFT}$–2th (closer to the center portion of the block than the trailing signal by one symbol) symbol, wherein the signal (symbol stream) of ith channel is si (k) and the code length thereof is Li (processes 1020 to 1080).

Meanwhile, the process 1050 is the process for judging to multiplex at which of the symbols on the beginning and ending sides of the block, and herein, this is the process for judging to multiplex at the beginning side of the block when a remainder is 0 when t is shared by 2 (in a case of YES), and to multiplex at the ending side of the block when the remainder is other than 0 (in a case of NO).

Also, the process 1060 is the process for determining the symbol position when multiplexing at the symbol on the beginning side of the block (in a case of YES in the process 1050), and the process 1070 is the process for determining the symbol position when multiplexing at the symbol on the ending side of the block (in a case of NO in the process 1050). Note that "floor(x)" represents the function returning the maximum integer number not larger than x to an input argument (real number) x.

The channel multiplex controller 29a repeats the above-described judgment and the determination of the symbol position until all the symbols of $N_{channel}$ channels are multiplexed (until either of the cyclic (loop) conditions (j<$N_{channel}$ and k<Li) in the processes 1030 and 1040 are not satisfied).

Figure 12:
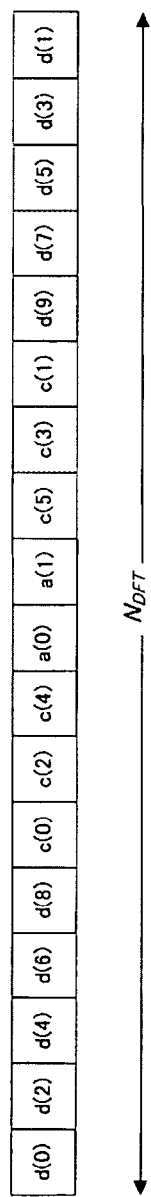
FIG. 12 is a schematic diagram illustrating the channel multiplexing process by the algorithm shown in FIG. 11.

FIG. 12 illustrates one example of the channel multiplexing by the above-described algorithm.

In FIG. 12, one example of alternately multiplexing preferentially from the signal of the channel of which code length is long from the beginning and the ending to the center portion of the block, supposing that $N_{DFT}$=18 (symbols), the code length $L_{data}$ of the data signal=10 (symbols), the code length $L_{CQI}$ of the CQI signal=6 (symbols), and the code length $L_{ACK/NACK}$ of the ACK/NACK signal=2 (symbols).

In this example, the data signal of which code length is the longest is time-division-multiplexed at the symbol positions (timings) d(0) to d(9) in this order, and the CQI signal of which code length is the second-longest is time-division-multiplexed at the symbol positions c (0) to c (5), in this order, and the ACK/NACK signal of which code length is the shortest is time-division-multiplexed at the symbol positions a(0) and a(1) in this order.

That is to say, the channel multiplex controller 29a is capable of controlling the time-division-multiplexing process of the channel multiplexer 16 such that the control signal and the data signal are located in a direction away from the boundary of the blocks in descending order of the code length.

According to the channel multiplexing method, the signal of the channel of which code length is shorter is easily time-division-multiplexed on the center portion side of the block less subject to the pulse shaping (signal attenuation) process by the window function processor 23 and to the multipath. Therefore, the control signal (CQI signal and ACK/NACK signal) of which code length is shorter than that of the data signal is easily time-division-multiplexed to the symbol position closer to the center portion of the block than the data signal, so that it is possible to suppress the degradation of the reception characteristics of the control signal at the receiver 3.

In addition, relatively, in the symbol position closer to the boundary of the blocks, the signal of which code length is longer is easily time-division-multiplexed, so that the effect of the signal on the reception characteristics after decoding at the receiver 3 is small.

Meanwhile, the channel multiplexing method of this embodiment also is not required to be implemented in blocks and this may be limited to a part of the blocks. For example, when cyclically transmitting the reference signal (RS) as in the Non-Patent Document 2, the target block of the offset multiplexing may be limited to the block adjacent to the block at which the RS is multiplexed.

Also, when setting the block adjacent to the RS block to the target block of the channel multiplexing method of this embodiment, it is possible to preferentially arrange the control signal after arranging the data signals on the side of the boundary with the RS block by the predetermined number of symbols.

Figure 13:
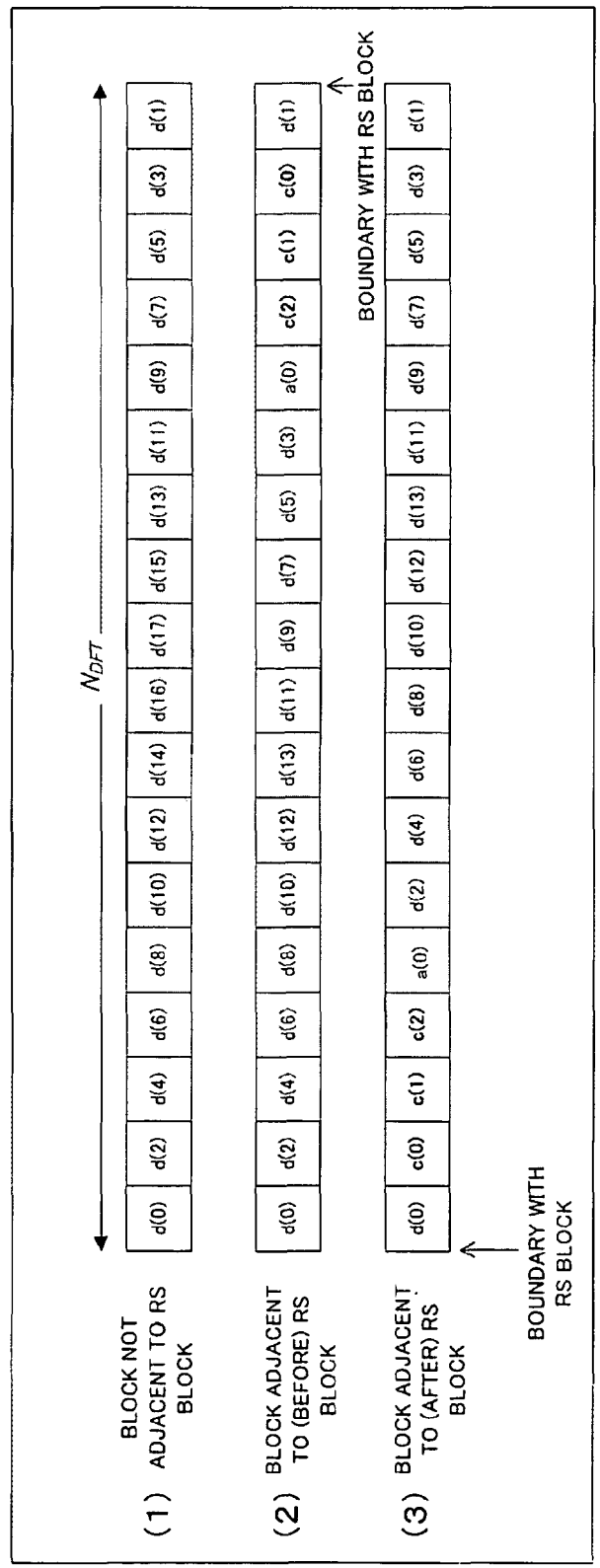
FIG. 13 is a schematic diagram illustrating another example of the channel multiplexing process at the transmitter shown in FIG. 10.

FIG. 13 shows one example thereof. As shown in (2) and (3) of FIG. 13, only one data signal symbol is arranged at the boundary with the RS block, and after that, the control signals (CQI signal and ACK/NACK signal) are preferentially arranged. Note that it is supposed that $N_{DFT}=18$ (symbols), the code length $L_{data}$ of the data signal=14 (symbols), the code length $L_{CQI}$ of the CQI signal=3 (symbols), and the code length $L_{ACK/NACK}$ of the ACK/NACK signals=1 (symbol).

For example, in the example shown in (2) of FIG. 13, the channel multiplex controller 29a controls the time-division-multiplexing process at the channel multiplexer 16 such that, the data signal symbol d(0) is arranged in one symbol time at the beginning of the block, then the data signal symbol d(1) is arranged in one symbol time at the ending of the block, and after that, the CQI signal symbols c(0), c(1) and c(2) and the ACK/NACK signal symbol a (0) are arranged toward the center portion of the block in this order, and remaining 12 symbols d(2) to d(13) are alternately arranged from the beginning and ending of the block in this order relative to remaining 12 symbol times, in the block adjacent to and temporally before the RS block.

On the other hand, in the example shown in (3) of FIG. 13, the channel multiplex controller 29a controls the time-division-multiplexing process in the channel multiplexer 16 such that the data signal symbol d(0) is arranged in one symbol time at the beginning of the block, then the CQI signal symbols c(0), c(1), and c(2) and the ACK/NACK signal symbol a(0) are arranged toward the center portion of the block in this order, and remaining 12 symbols d(2) to d(13) of the data signal symbol are alternately arranged from the beginning and ending of the block in this order relative to the remaining 12 symbol times, in the block adjacent to and temporally after the RS block.

Meanwhile, as for the block, which is not adjacent to the RS block, as shown in (1) of FIG. 13, the channel multiplex controller 29a controls the time-division-multiplexing process in the channel multiplexer 16 such that 18 data signal symbols d(0) to d(17) are alternately arranged from the beginning and the ending sides of the block in this order.

That is to say, the channel multiplex controller 29a is capable of controlling the time-division-multiplexing process of the channel multiplexer 16 such that the control signal symbol is preferentially time-division-multiplexed in the process of time-division-multiplexing such that each signal of the data symbol is located in order in a direction away from the boundary of the blocks, when the bock boundary is the boundary with the RS block at which the reference signal used for propagation channel estimation at the receiver 3 is multiplexed.

In the channel multiplexing method illustrated in FIG. 12, the symbol time closer to the boundary of the blocks preferentially multiplexes the signal of the channel of which code length is longer without exception, so that generally the control signals (ACK/NACK signal and CQI signal) of which code length is shorter than that of the data signal is easily arranged in the center portion of the block and is temporally away from the RS, and as a result, accuracy of the channel estimation value used for compensating the control signal at the receiver 3 might be degraded.

On the other hand, according to the channel multiplexing method illustrated in FIG. 13, it becomes possible to prevent the control signal to be temporally too far away from the RS, so that it becomes possible to perform the channel compensation of the control signal using the channel estimation value having better accuracy obtained based on the RS temporally closer to the control signal at the receiver 3.

Meanwhile, in FIG. 13, although only one data signal symbol is arranged between the boundary with the RS block and the control signal, it is also possible to preferentially arrange two or more data signal symbols. As for the number of offset symbols also, it is desirable to determine the same in view of a degree of degradation of the channel estimation accuracy due to a temporal distance from the RS as one of parameters in relation to the parameters such as ACLR, SEM, EVM of the system.

[4] Third Embodiment

Figure 14:
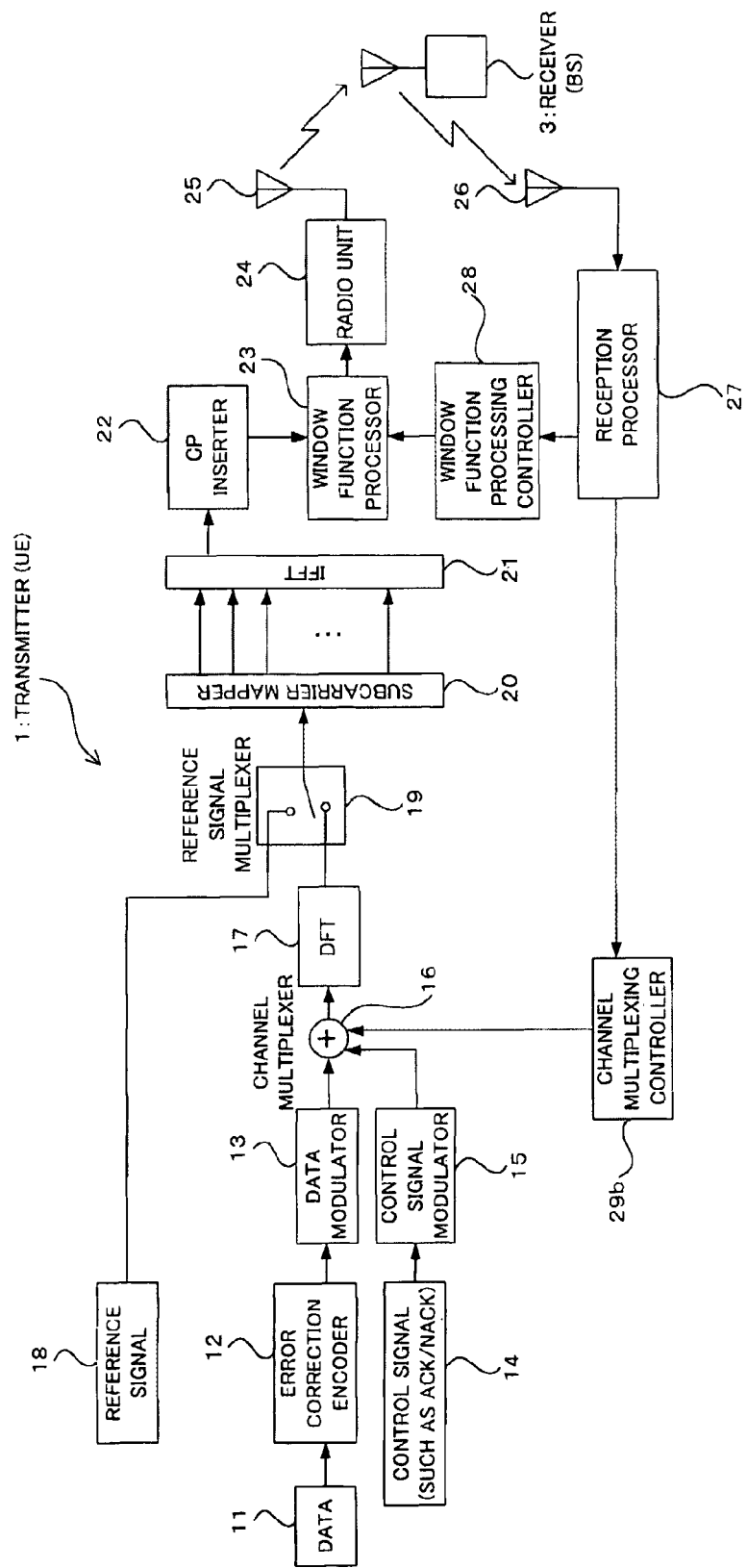
FIG. 14 is a block diagram illustrating a configuration example of the transmitter (UE) according to a third embodiment.

FIG. 14 is a block diagram illustrating a configuration of the transmitter according to a third embodiment. The transmitter 1 shown in FIG. 14 is different from the already-described transmitter 1 shown in FIG. 2 in that this is alternatively provided with a channel multiplex controller 29b. Meanwhile, in FIG. 14, the component given the same reference numeral as already described numeral is provided with the function the same as or similar to that already described, unless otherwise noted hereinafter. In addition, the configuration of the receiver 3 may be the same as or similar to that of the already described receiver.

Herein, the channel multiplex controller 29b of this embodiment determines the number of symbols by which the time-division-multiplexed position (timing) of the control signal is offset from the boundary of the blocks, based on the information or combination of two or more of the information regarding any of the system band, the allocated transmission band, and the allocated transmission bandwidth received at the reception processor 27 (notified or allocated by the receiver 3), and controls the time-division-multiplexing process at the channel multiplexer 16 according to the number of offset symbols.

For example, in a case in which the allocated transmission bandwidth is a narrow band and the allocated transmission band (starting position) is at an end of the system band, this is a strict condition in view of ACLR and SEM, and in the window function processor 23, there is a case in which more moderate window function processing (signal attenuation process) of which time window $N_{win}$ is longer than that in a case in which the allocated transmission band is allocated near the center portion of the system band is performed.

Figure 15:
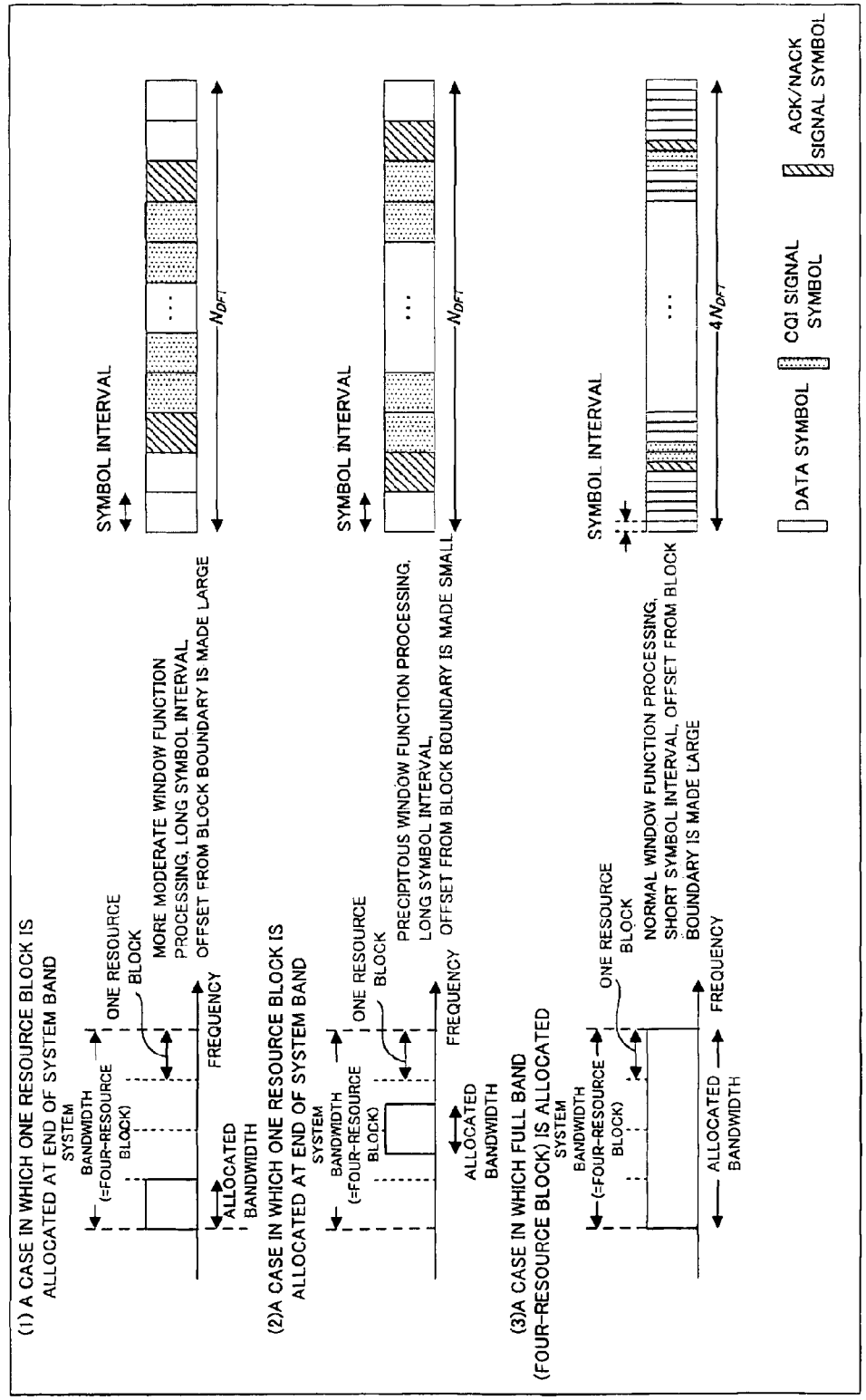
FIG. 15 is a schematic diagram illustrating one example of the channel multiplexing process at the transmitter shown in FIG. 14.

(1) of FIG. 15 illustrates one example thereof. Herein, the example in which the system bandwidth is four-resource block (RB), the allocated transmission bandwidth is 1RB, and the starting position of the allocated transmission band is at the end of the low frequency side of the system band is shown.

In such a case, it is preferable that the number of offset symbols is made larger than that in a case in which the allocated transmission band is allocated near the center portion of the system band, as shown in (2) of FIG. 15. For example, in the example shown in (1) of FIG. 15, it is set that the number of offset symbols=2.

In addition, when the allocated transmission bandwidth is a wideband, for example, when the transmission band is allocated across a full band (4RB) of the system band, as illustrated in (3) of FIG. 15, the time interval for one symbol becomes short. Therefore, when the amount of the interblock interference by the time window processing in the transmitter 1 (window function processor 23) and that of the interblock interference by the multipath are the same, more symbols near the boundary of the blocks are affected as compared to the case when the allocated transmission bandwidth is small.

In such a case also, it is preferable that the number of the offset symbols is made larger than in a case in which the allocated transmission band is allocated near the center portion of the system band as shown in (2) of FIG. 15. For example, in the case shown in (3) of FIG. 15, it is set that the number of offset symbols=6.

FIG. 16 illustrates one example of selection (determination) criteria of the number of offset symbols depending on the allocated transmission band (starting position) and the allocated transmission bandwidth in a case in which $N_{FFT}=8$. In FIG. 16, the transmission band (starting position)=0 to 7 represents the offset position in RB unit from the end of the low frequency side of the system band, for example, and the transmission bandwidth=1 to 8 represents the number of RBs, for example.

The channel multiplex controller 29b holds the data, which is the criteria for determining (selecting) the number of offset symbols in a memory or the like not shown in a table format or the like, and determines (selects) the number of offset symbols corresponding to the allocated transmission band (starting position) and the allocated transmission bandwidth (number of RBs) obtained at the reception processor 27 based on the data.

For example, in the example shown in FIG. 16, when the transmission bandwidth of 1RB is allocated to the end of the system band (starting position of the allocated transmission band is 0 or 7), the number of offset symbols is 3. That is to say, the number of offset symbols larger than that in the case in which the same transmission bandwidth of 1RB is allocated to other than the end of the system band is selected.

In such a manner, the channel multiplex controller 29b is capable of determining the amount of the data signal assigned between the boundary of the blocks and the control signal depending on any one of or combination of two or more of the frequency band available in the system (system frequency band), the allocated frequency bandwidth allocated by the receiver 3, and the allocated frequency band allocated by the receiver 3.

Meanwhile, the data (table) shown in FIG. 16 may be notified from the transmitter 1 to the receiver 3 as one of the control signals or may be set in advance in the transmitter 1 and the receiver 3 (for example, the CP eliminator 33) as the system specification, so as to be shared with the receiver 3. In the latter case, the notification from the transmitter 1 to the receiver 3 may be made unnecessary.

Also, when a plurality of system bands are set, it is possible to perform the selection of the number of offset symbols depending on the above-described allocated transmission band (starting position) and the allocated transmission bandwidth (number of RBs) for each system band by allowing the channel multiplex controller 29b, for example, to have the data (table) shown in FIG. 16 for each system band.

[5] Fourth Embodiment

As described above, in the process of the transmission in the transmitter 1, the signal quality is relatively degraded not only near the boundary of the blocks due to the signal attenuation process, but also near the change point (timing) of the transmitted power, relative to other portions.

Therefore, in this embodiment, it is described to treat the change point of the transmitted power equally with the boundary of the blocks in the already described embodiment, thereby offsetting the control signal from the change point of the transmitted power by a predetermined symbol time to time-division-multiplex.

Figure 17:
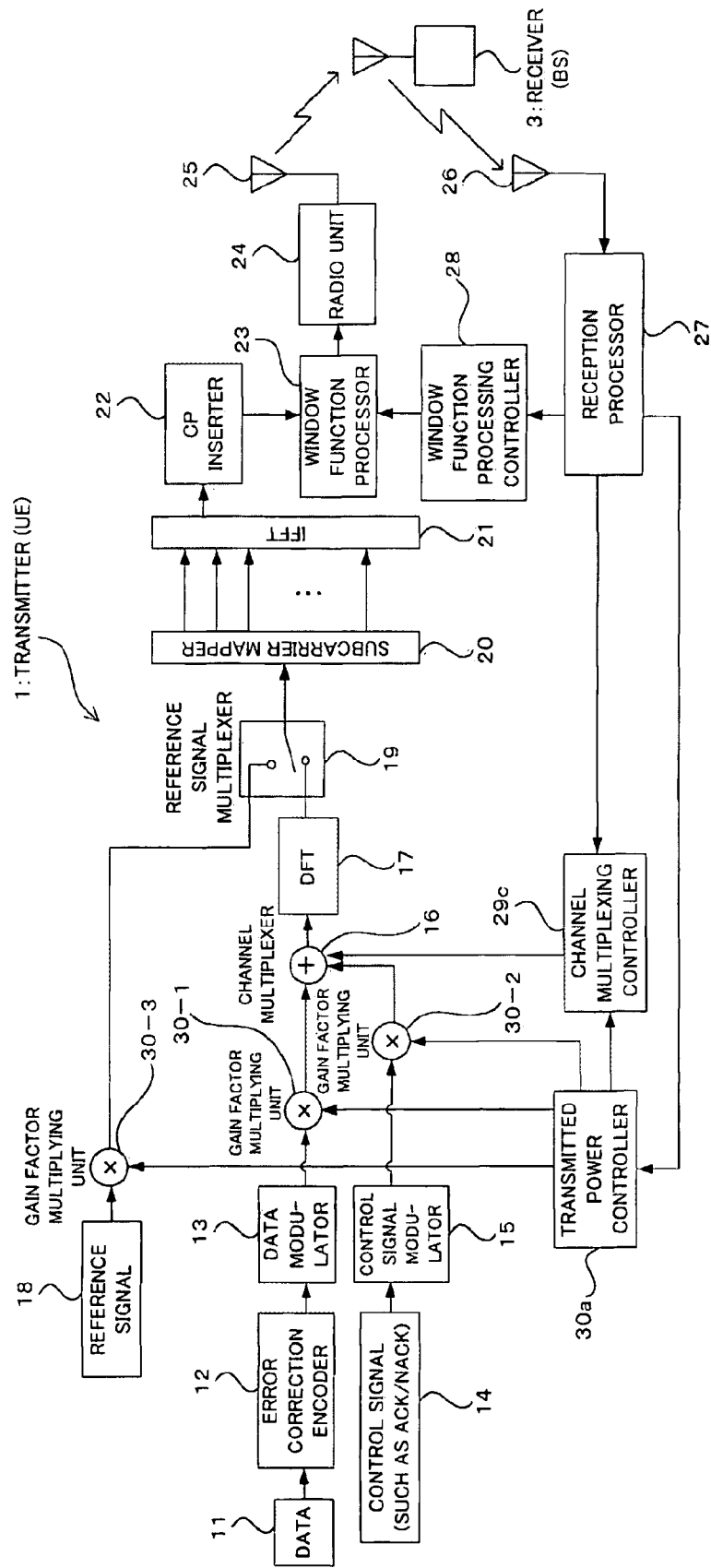
FIG. 17 is a block diagram illustrating a configuration example of the transmitter (UE) according to a fourth embodiment.

FIG. 17 illustrates the configuration example of the transmitter 1 of this embodiment. The transmitter 1 shown in FIG. 17 is different from the already described transmitter 1 shown in FIG. 2 in that this is provided with the channel multiplex controller 29c alternatively and the transmitted power controller 30a additionally, and gain factor multiplying units 30-1, 30-2 and 30-3 are provided on signal lines from the data modulator 13 to the channel multiplexer 16, from the control signal modulator 15 to the channel multiplexer 16, and from the reference signal generator 18 to the reference signal multiplexer 19, respectively. Meanwhile, in FIG. 17, the component given the same reference numeral as above described numeral is provided with the function the same as or similar to that of the above-described one unless otherwise noted hereinafter. In addition, the configuration of the receiver 3 may be the same as or similar to that of the already described receiver.

Herein, the transmitted power controller 30a determines the transmitted power based on the transmitted power control information received from the receiver 3 by the reception processor 27, and controls the signal power of each signal as digital signal processing by multiplying the gain factor depending on the transmitted power by the data signal, the control signal and the reference signal at the gain factor multiplying units 30-1, 30-2 and 30-3, respectively. Meanwhile, the gain factor may be the value common to each of the multiplying units 30-1, 30-2 and 30-3 or may be the individual values.

The channel multiplex controller 29c controls the time-division-multiplexing process by the channel multiplexer 16 such that, upon reception of the notification of the information regarding the power control timing by the transmitted power controller 30a, the control signal is time-division-multiplexed at the symbol time offset from the timing at which the power change is generated by not less than one symbol time, based on the power control timing information.

Figure 18:
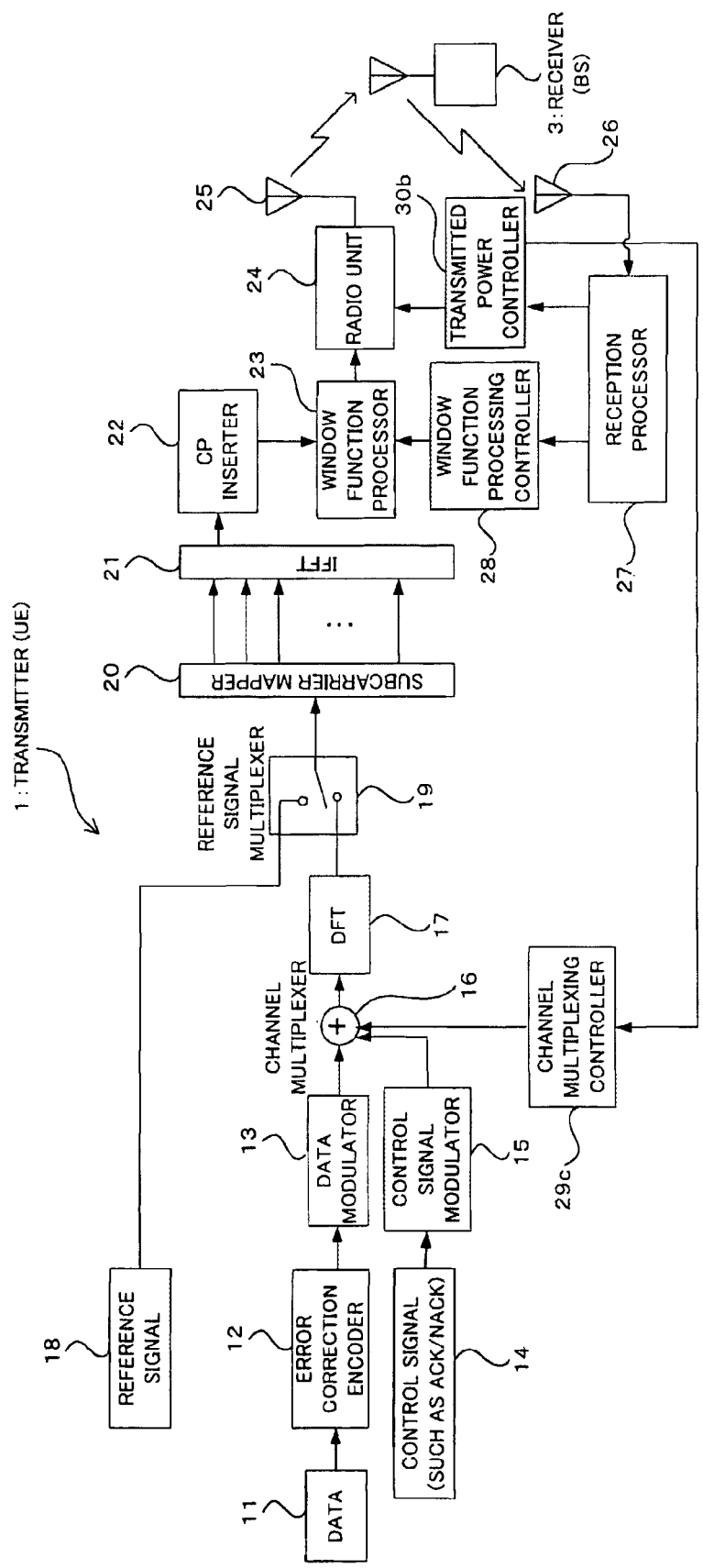
FIG. 18 is a block diagram illustrating a variant of the transmitter shown in FIG. 17.

Meanwhile, there is a case in which the control of the transmitted power at the transmitter 1 is implemented by analog signal processing at the radio unit 24. For example, in a case in which the power control (variable) width, which may not be realized by the digital signal processing, is required, it is preferably controlled by the analog signal processing. In such a case, for example, as shown in FIG. 18, a transmitted power controller 30b for controlling the transmitted power (for example, gain of a power amplifier not shown) at the radio unit 24 may be alternatively provided.

Figure 19:
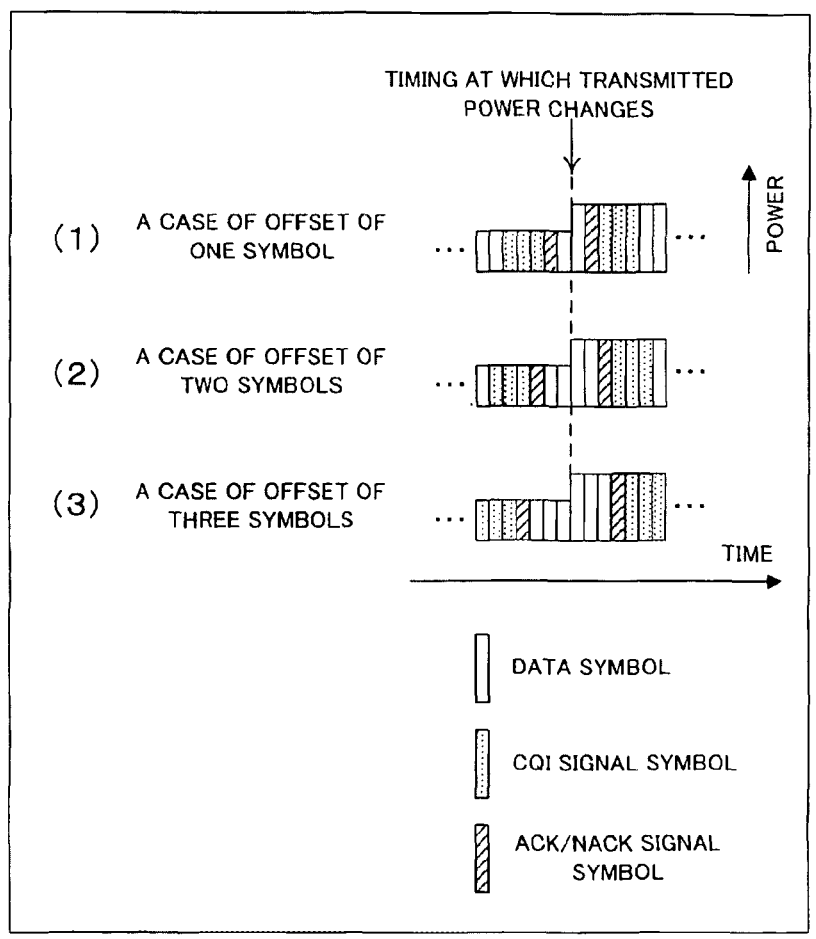
FIG. 19 is a schematic diagram illustrating one example of the channel multiplexing process at the transmitter shown in FIG. 17 or 18.

FIG. 19 illustrates one example of the channel multiplexing process of this embodiment.

That is to say, the channel multiplexer 16 of this embodiment performs multiplexing such that the control signal symbol is arranged at the position (timing) spaced apart (offset) from the transmitted power control timing (power change point) by the transmitted power controller 30a (or 30b) by a time period of the predetermined number of symbols, in the time domain, under the control of the channel multiplex controller 29c.

(1) to (3) of FIG. 19 each illustrates a state in which the control signal symbol is time-division-multiplexed at the position (timing) offset from the power change point by one to three symbol time. Note that the number of offset symbols is not limited to one to three symbol.

Also, it is desirable that the number of offset symbols is determined in view of the time duration per one symbol and various parameters such as ACLR, SEM and EVM required by the system, in this embodiment also.

Meanwhile, the channel multiplex controller 29c may control the time-division-multiplexing process by the channel multiplexer 16 based on the code lengths of the data signal and the control signal, as described in the second embodiment (FIG. 12).

That is to say, for example, the channel multiplexer 16 may be controlled (set) such that the signal of which code length is longer is multiplexed at the timing closer to the power change point than other signals. In this manner, the effect and advantage similar to those of the second embodiment may be obtained.

Figure 20:
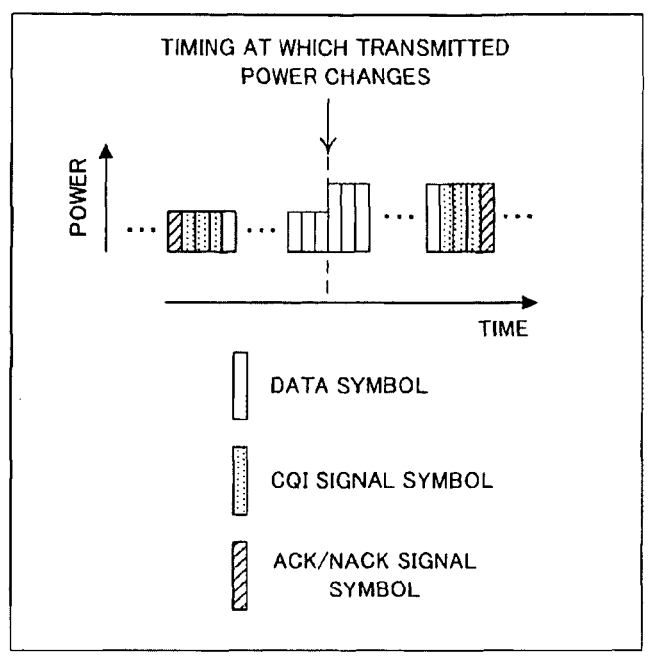
FIG. 20 is a schematic diagram illustrating another example of the channel multiplexing process at the transmitter shown in FIG. 17 or 18.

FIG. 20 illustrates one example thereof. FIG. 20 illustrates a state in which the signal of which code length is longer is time-division-multiplexed at the symbol time closer to the power change point, supposing that the code length is longer in the order of the data signal, the CQI signal and the ACK/NACK signal.

That is to say, the channel multiplex controller 29c is capable of controlling the time-division-multiplexing process at the channel multiplexer 16 such that the control signal and the data signal are located in a direction away from the timing of the power change point in descending order of the error resilience of each signal.

Meanwhile, the offset multiplexing regarding the power change point of this embodiment may be implemented together with the offset multiplexing for the above-described block boundary.

In this case, in the time domain, regarding both of the power change point and the boundary of the blocks, the channel multiplex controller 29c controls the time-division-multiplexing at the channel multiplexer 16 to assign at least a part (not less than one symbol) of the data signals between them and the control signal.

Figure 21:
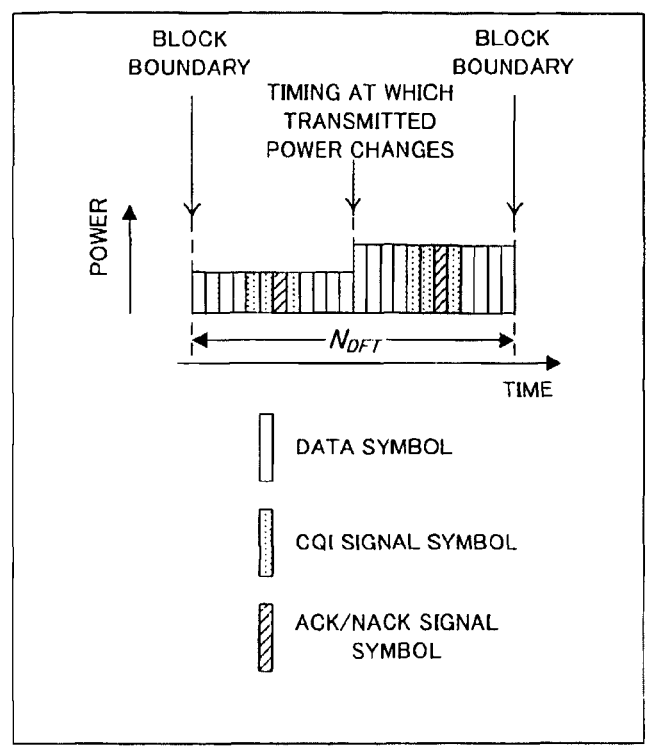
FIG. 21 is a schematic diagram illustrating another example of the channel multiplexing process at the transmitter shown in FIGS. 17 and 18.
Figure 22:
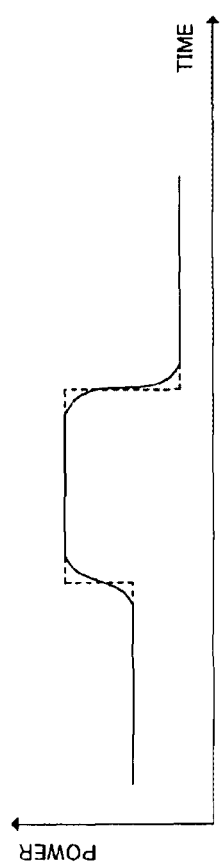
FIG. 22 is a schematic diagram illustrating one example of power change due to transmitted power control at the transmitter.

FIG. 21 illustrates one example of the channel multiplexing. FIG. 21 illustrates a state in which the ACK/NACK signal of which code length is shorter than that of the CQI signal is time-division-multiplexed through the data symbol and the CQI signal symbol such that this is spaced apart from both of the power change point and the boundary of the blocks. Note that the arrangement is not limited to that shown in FIG. 21.

For example, when the boundary of the blocks is the boundary of the blocks with the RS block, it is possible to control such that the control signal symbol is multiplexed at the symbol time closer to the RS block through one or more data symbol in order to apply the high-accuracy channel estimation result based on the RS block at the receiver 3.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method of signal multiplexing in a radio communication system, the system having a transmitter which time-division-multiplexes a plurality of signals at a predetermined block size and transmits the multiplexed signal to a receiver, the method comprising:
performing the time-division-multiplexing, at the transmitter in time domain, to assign the plurality of signals so as to be located in a direction away from a timing at which transmitting power of the multiplexed signal varies in a descending order of a code length of each signal for each of both sides of the timing.

2. The method according to claim 1, wherein the plurality of signals comprise a first, a second and a third signal, the first signal is a data signal, the second signal is a CQI signal, and the third signal is an ACK signal or a NACK signal.

3. A transmitter which time-division-multiplexes a plurality of signals at a predetermined block size and transmits the multiplexed signal to a receiver, wherein
the transmitter configured to perform the time-division-multiplexing in time domain to assign the plurality of signals so as to be located in a direction away from a timing at which transmitting power of the multiplexed signal varies in a descending order of a code length of each signal for each of both sides of the timing.

4. The transmitter according to claim 3, wherein the plurality of signals comprise a first, a second and a third signal, the first signal is a data signal, the second signal is a CQI signal, and the third signal is an ACK signal or a NACK signal.

5. A radio communication system comprising:
a receiver; and
a transmitter which time-division-multiplexes a plurality of signals at a predetermined block size and transmits the multiplexed signal to the receiver, wherein:
the transmitter configured to perform the time-division-multiplexing in time domain to assign the plurality of signals so as to be located in a direction away from a timing at which transmitting power of the multiplexed signal varies in a descending order of a code length of each signal for each of both sides of the timing; and
the receiver configured to receive the multiplexed signal transmitted from the transmitter.

* * * * *